United States Patent
Dubin et al.

(10) Patent No.: US 8,577,743 B2
(45) Date of Patent: *Nov. 5, 2013

(54) MANAGING TRANSACTIONS OF BROKER AFFILIATES

(75) Inventors: Jacob M. Dubin, Lee's Summit, MO (US); Jerry L. Thompson, Shawnee, KS (US)

(73) Assignee: Stubhub, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,310

(22) Filed: Jun. 5, 2012

(65) Prior Publication Data

US 2012/0259733 A1    Oct. 11, 2012

Related U.S. Application Data

(63) Continuation of application No. 12/876,216, filed on Sep. 6, 2010, now Pat. No. 8,204,796, and a continuation of application No. 10/606,086, filed on Jun. 25, 2003, now Pat. No. 7,792,700.

(51) Int. Cl.
  *G06Q 30/00* (2012.01)
(52) U.S. Cl.
  USPC ............. 705/26.25; 705/26.1; 705/26.61; 705/26.62; 705/26.63; 705/27.1; 705/27.2
(58) Field of Classification Search
  USPC .............................................. 705/26.1–27.2
  See application file for complete search history.

(56) References Cited

U.S. PATENT DOCUMENTS

| | | |
|---|---|---|
| 6,219,653 B1 | 4/2001 | O'Neill et al. |
| 7,216,109 B1 | 5/2007 | Donner |
| 7,792,700 B2 | 9/2010 | Dubin et al. |
| 8,204,796 B2 | 6/2012 | Dubin et al. |
| 2002/0082956 A1 | 6/2002 | Peterson et al. |
| 2002/0120506 A1 | 8/2002 | Hagen |
| 2002/0128922 A1 | 9/2002 | Joao |
| 2002/0138399 A1 | 9/2002 | Hayes et al. |
| 2002/0174028 A1 | 11/2002 | Anderson et al. |
| 2003/0236736 A1 | 12/2003 | Harmon et al. |
| 2004/0111303 A1 | 6/2004 | Francis |
| 2005/0246245 A1 | 11/2005 | Satchell et al. |

OTHER PUBLICATIONS

"The scramble for the best seat in the house" Scott McLennan. Telegram & Gazette. Worcester, Mass.: Apr. 27, 2003. p. A.1. Retrieved via ProQuest.*

(Continued)

*Primary Examiner* — Michael Misiaszek
(74) *Attorney, Agent, or Firm* — Schwegman Lundberg & Woessner, P.A.

(57) ABSTRACT

A distributed network transaction system and method includes a central exchange computer connected via the Internet (world wide web) to multiple remote computers associated with, for example, individual brokers. A central database is provided with the exchange computer and each remote computer can have a respective database for information that the individual brokers was to maintain separate from the system. E-commerce transactions are conducted by the system, which performs a number of transaction-related functions, such as pushing tickets up to the system for sale, purchasing tickets online, shipping, web site-related and bookkeeping. The system and methodology accommodate price event functions where non real-time tickets can be sold and the orders filled with tickets acquired on the system.

20 Claims, 75 Drawing Sheets

(56) References Cited

OTHER PUBLICATIONS

Jones, Walter C. "Spring's the season for scalpers", The Florida Times-Union, Apr. 2, 2000, pp. 2, Jacksonville, Florida. http://jacksonville.com/tu-online/stories/040200/met_2643168.html.

Ticket Solutions, Inc., sales brochure, www.ticketsolutions.com/about-us/.

McLennan, Scott, "The scramble for the best seat in the house", Telegram & Gazette, Apr. 27, 2003, p. A.1., Worcester, Massachusetts.

* cited by examiner

| RULE | EFFECTS | WHERE | TYPE |
|---|---|---|---|
| Show my ticket group(s) everywhere | My Tickets | Everywhere | Show Mode |
| Show my ticket group(s) on my website | My Tickets | My Website | Show Mode |
| Don't show my ticket group(s) on my website | My Tickets | My Website | Show Mode |
| Show my ticket group(s) on this broker's website | My Tickets | Others Website | Show Mode |
| Don't show my ticket group(s) on this broker's website | My Tickets | Others Website | Show Mode |
| Show my ticket group(s) on my eXchange | My Tickets | My eXchange | Show Mode |
| Don't show my ticket group(s) on my eXchange | My Tickets | My eXchange | Show Mode |
| Show my ticket group(s) on this broker's eXchange | My Tickets | Others eXchange | Show Mode |
| Don't show my ticket group(s) on this broker's eXchange | My Tickets | Others eXchange | Show Mode |
| Show this broker's ticket group(s) on my website | Others Tickets | My Website | Show Mode |
| Don't show this broker's ticket group(s) on my website | Others Tickets | My Website | Show Mode |
| Show this broker's ticket group(s) on my eXchange | Others Tickets | My eXchange | Show Mode |
| Don't show this broker's ticket group(s) on my eXchange | Others Tickets | My eXchange | Show Mode |
| Markup my ticket group(s) on my website | My Tickets | My Website | Markup |
| Markup this broker's ticket group(s) on my website | Others Tickets | My Website | Markup |
| Only show my ticket group(s) on my website | My Tickets/Others Tickets | My Website | Show Mode |
| Only show my ticket group(s) on my eXchange | My Tickets/Others Tickets | My eXchange | Show Mode |
| Don't show any ticket group(s) on my website | My Tickets/Others Tickets | My Website | Show Mode |
| Don't show any ticket group(s) on my eXchange | My Tickets/Others Tickets | My eXchange | Show Mode |
| Only show my ticket group(s) on my website (Qty Limited) | My Tickets/Others Tickets | My Website | Show Mode |

FIG. 3

You can create non real-time tickets that will show up in the system. If the tickets are not real, you must mark them fake so they will not show up on other broker's websites. This is the default.

SEARCH SOS EVENTS

EVENT NAME  _____

VENUE NAME  _____

EVENT DATE  _____

[SEARCH]

---

TICKET INFORMATION

SECTION  _____          ☑ SHOW ON THE WEB

ROW  _____             ☐ SHOW ON EXCHANGE

FIRST SEATS (01-10)  _____

QUANTITY  [1 ▼]

LIST PRICE  _____       ☑ FAKE TICKETS

FACE  _____             ☑ ALLOW SPLITTING
                          OF TICKET GROUP

[ADD TICKETS]

*FIG. 6*

These rules denote how many tickets you will sell from a package of tickets. For example, if you have 4 tickets, you would by default sell 4 or 2 tickets, but not 3 or 1, which would leave you with a single. You can change this behavior here.

| QTY | POSSIBLE SPLITS |
|---|---|
| 2 | 2 |
| 3 | 3,1 |
| 4 | 4,2 |
| 5 | 5,3,2,1 |
| 6 | 6,4,2 |
| 7 | 7,5,4,3,2,1 |
| 8 | 8,6,4,2 |
| 9 | 9,7,6,5,4,3,2,1 |
| 10 | 10,8,6,4,2 |
| 11 | 11,9,8,7,6,5,4,3,2,1 |
| 12 | 12,10,8,6,4,2 |
| 13 | 13,11,10,9,8,7,6,5,4,3,2,1 |
| 14 | 14,12,10,8,6,4,2 |
| 15 | 15,13,12,11,10,9,8,7,6,5,4,3,2,1 |
| 16 | 16,14,12,10,8,6,4,2 |
| 17 | 17,15,14,13,12,11,10,9,8,7,6,5,4,3,2,1 |
| 18 | 18,16,14,12,10,8,6,4,2 |
| 19 | 19,17,16,15,14,13,12,11,10,9,8,7,6,5,4,3,2,1 |
| 20 | 20,18,16,14,12,10,8,6,4,2 |

FIG. 7

BROKER SETTINGS

CREDIT CARD

This is the credit card that will be used to buy tickets from other brokers on credit card items:

CARD NUMBER:
NAME ON THE CARD:
CARD EXPIRATION:
CARD TYPE:

CREDIT CARD PROCESSOR

Be sure to leave this blank if you are not currently using a service.

PROCESSOR:   ⦿ Verisign   ○ Authorize Net   ○ None
PARTNER: Verisign
USERNAME:
PASSWORD:

DOMAINS:

| ID | DOMAIN | FULL CHARGE | AUTH 1$ | NONE | CSC |
|----|--------|-------------|---------|------|-----|
| 1 | ticketsolutions.com | ○ | ⦿ | ○ | ☐ |
| 3 | priceeventweb.com | ○ | ○ | ⦿ | ☐ |
| 45 | tickets4u.com | ○ | ○ | ⦿ | ☐ |

WEBSITE

Rules for marking up the price on your tickets, and other brokers tickets

DEFAULT MARKUP: 40%
DEFAULT MARKUP (MY TIX): 0%
MINIMUM MARKUP: 35
HANDLING FEE: 0%
WEBSALE CUTOFF: 48 Hours

[Update]

*FIG. 8*

- site selection
- upload
- URL builder
- default page
- change header
- change footer
- about page
- privacy policy
- terms of use
- colors & fonts
- confirm e-mail
- contact e-mail
- e-mail's header
- refresh website
- event calendar
- HotEvents editor Which website do you want to edit?

[ ticketsolutions.com ]

[ Select Domain ]

*FIG. 9*

TRANSACTION STEPS 1) webservice sends request
2) server parses and builds request documents
3) server sends request to app #1
4) app #1 sends back tickets
5) server sends sell document to app #2
6) app #2 issues back confirm
7) server sends confirm to webservice
8) webservice issues a CLOSE CON
9) server sends acknowledgment to app #2
10) app #2 issues CLOSE CON
11) server sends acknowledgment to app #1
12) app #1 acknowledges CON CLOSED
13) server sends acknowledgment to webservice

FIG. 10

Enterprise:

| File Purchase Sales Manage Reports Windows |

Inventory Screen
- ☐ Default Group Pricing
- ☑ Sort by List Price
- ☑ Show Reserved In-Line Venue Map Path: http://
Report Path: C:\Program Files\Ticket Solutions\Enterprise\repre
TicketsNow Path: C:\Documents and Settings\Administrator\Desktop
Fax Auth. Comments: fax authorization comment

Broker Information
- Name:
- Address:
- City:
- State: Zip Code:
- Phone #: (913)384-4751
- Fax #: (913)451-7832
- ☑ Show this info on invoices

Invoice Disclaimer
- Line 1:
- Line 2:
- Line 3:
- Line 4:
- Sig:

Automatically Print Invoices received from Web Orders

Miscellaneous
- Print Web Invoices ☑    Auto Complete Sales ☐
- Tax Exempt Default ☑    BL Card pop up ☑
- Edit Handling Fee ☑    Grouped Invoice ☐
- Handling Default 10%    Cust Fax on Invoices ☑
- Cust P2 on Invoices ☑
- Location Default ☐    Cust Cell on Invoices ☑
- Handling Text
- Notify me about new Enterprise versions ☑

Left: 0.25
Right: 0
Top: 0
Bottom: 0

Customer Requirements
- ☑ Upper Case    ☑ Last Name
- ☐ Fax    ☑ City
- ☐ E-Mail    ☑ Referral Save

FIG. 15B

4. MASS PO

USE TO SEARCH FOR MASS POs, ADVANCED QUOTES OR CANCELLED POs

FILE  PURCHASES  SALES  MANAGE  REPORTS  WINDOWS

HEADLINER: ELLEN DEGENERES (CONCERTS) ▽  DATE: [ ]  [SEARCH]  ☐ SHOW EXPIRED  [CONSIGNMENTS] [EXPIRED ALL SOLD]

FOUND EVENTS: 1

SEATING SELECTION
CATEGORY   SECTION   ROW

| LIST | WHOLESALE |
|------|-----------|

SECTION: [ ]       ▽ SHOW ALL

LOCATION: [ ] ▽  ☑ IN HAND       ○ WHOLESALE
                                 ○ RETAIL

SET PRICE: [ ]
+/- $ CHANGE: [ ]
+/- % CHANGE: [ ] ▽   CATEGORY: [ ] ▽ [UPDATE CAT] [CLEAR]

[UPDATE SELECTED] [ADD TO EXCHANGE] [UNSHARE]

[ADD TO PO]       [VENUE MAP [F2]]

TICKET COUNT: 8

| IN | LOC | EVENT | VENUE | EVENT DATE | CAT | SECTION | ROW | SEAT | LIST | COST | SOLDPRICE | WHOLE |
|----|-----|-------|-------|------------|-----|---------|-----|------|------|------|-----------|-------|
|    |     |       |       |            |     |         |     |      |      |      |           |       |
|    |     |       |       |            |     |         |     |      |      |      |           |       |
|    |     |       |       |            |     |         |     |      |      |      |           |       |

*FIG. 16*

5. ADVANCED QUOTES

📁 FILE  PURCHASES  SALES  MANAGE  REPORTS  WINDOWS

* REVIEW SOLD TICKETS ON ADVANCED QUOTES

| TASKS | PO | EVENT | EVENT DATE | VENUE | AVG FACE | AVG COST | AVG SOLDFOR | SECTION | ROW | SEATS | CUSTOMER |
|---|---|---|---|---|---|---|---|---|---|---|---|
| FIND PO's (CTRL+F)... | 40547 | DALLAS COWBOYS | 11/24/2002 | TEXAS STADIUM | $0.00 | $0.00 | $0.00 | 0 | 37 | 105-107 | ROBERT MARSHALL |
| PRINT PO (CTRL+P)... | 40547 | DALLAS COWBOYS | 11/24/2002 | TEXAS STADIUM | $0.00 | $0.00 | $0.00 | 06 | 38 | 105-106 | ROBERT MARSHALL |
| | 40547 | xxxxxxxxxxxxxx | x/xx/xxxx | XXXX XXXXXXX | $0.00 | $0.00 | $0.00 | X | I | X | XXXXX XXXXXXX |
| VIEW PO (CTRL+V)... | 44177 | GEORGE STRAIT | 2/28/2003 | FREEDOM HAL CENTER | $0.00 | $64.87 | $160.00 | SEC 11 | G | 07-08 | TICKET MASTER TICKE |
| | 44177 | GEORGE STRAIT | 2/28/2003 | FREEDOM HAL CENTER | $0.00 | $0.00 | $180.00 | SEC 11 | B | 01-02 | TICKET MASTER TICKE |
| VIEW MASS PO (CTRL+M) | 40325 | HAIRSPRAY | 12/3/2003 | NEIL SIMON THEATRE | $0.00 | $0.00 | $200.00 | DRCH | S | 17-19 | WARREN KANTOR |
| | 41XX | XXXXXXXX | X/XX/XXXX | XXX XXXXX XXXXX | $0.00 | $0.00 | $0.00 | XXXX | X | XXXXX | XXXXXX XXXXX |
| | 42197 | PHISH | 2/18/2003 | PEPSI CENTER END | $0.00 | $42.11 | $90.00 | 308 | 15 | 10-11 | PHISH FAN CLUB |
| | 42137 | PHISH | 2/18/2003 | PEPSI CENTER END | $0.00 | $42.75 | $75.00 | 324 | 06 | XX-XX | PHISH FAN CLUB |
| | 42129 | PHISH | 2/18/2003 | PEPSI CENTER END | $0.00 | $42.20 | $75.00 | 328 | 11 | 09-12 | PHISH FAN CLUB |
| | 4XXX | XXXXX | X/XX/XXXX | XXX XXX XXXXX | $90.00 | $107.27 | $107.00 | 0000 | XX | XX-XX | XXX XXX XXXX |
| | 38320 | ROLLING STONES | 10/12/2002 | FARD FIELD (STONES) | $90.00 | $107.27 | $107.27 | 105 | 31 | 01-10 | TICKET MASTER TICKE |
| | XXXX | XXXXXXXXXXXXXX | X/XX/XXXX | XXX XXX XXXXX | $0.00 | $0.00 | $0.00 | XXX | XX | XX-XX | XXX XXX XXXX |
| | 43012 | ST LOUIS RAMA VS SAN | 12/30/2002 | EDWARD JONES DOME | $0.00 | $0.00 | $20.00 | 405 | A | 04-05 | NICK METZGER |

ABILITY TO SEARCH FOR A PARTICULAR PO, PRINT THE PO AND VIEW THE PO

* FOR TICKETS SOLD ON AN ADVANCED QUOTE, PO MUST BE COMPLETE FOR ACCOUNTING PURPOSES

*FIG. 17*

6. PO QUEUE
CONTAINS QUEUED DATA FROM NON-REAL TIME SALES OFF THE EXCHANGE, WHICH CAN BE EDITED AND MATCHED AGAINST
AN EVENT AND THEN COMPLETED INTO A COMPLETED PO

FILE  PURCHASES  SALES  MANAGE  REPORTS  WINDOWS

SEARCH
EVENT:            EVENT DATE:                    [SEARCH]  [PRINT INVOICE]
VENUE:            ASSIGNED TO: [UNASSIGNED ▽]    [CLEAR]   [TRADER IMPORT]

— QUEUED PURCHASE ORDERS - DOUBLE CLICK TO EDIT:
| ASSIGNED TO | REF NO. | INV ID | EVENT | VENUE | EVENT DATE-TIME | ODD | SEATING | QTY | COST | FACE | SOLD FOR | PURCHASED FROM |
|---|---|---|---|---|---|---|---|---|---|---|---|---|

EVENT: [CMT FLAMEWORTHY VIDEO MUSIC]   EVENT DATE: [4/7/2003]   STATE: [ ]   [SEARCH]  [ADD EVENT]
VENUE: [                            ]   CITY:       [        ]   SHOW EXPIRED ☐   [CLEAR]

— EVENTS
| EVENT | VENUE | EVENT DATE | EVENT TIME | CITY & STATE | EVENT ID |
|---|---|---|---|---|---|
| CMT FLAMEWORTHY VIDEO MUSIC AWARDS | GAYLORD ENTERTAINMENT | 04/07/03 | 8:00 PM | NASHVILLE, TN | 222105 |

| STATUS | ASSIGNED | TYPE | SALES REP | CUSTOMER | EVENT-VENUE | EVENT DATE | ET | QTY | SEATING | SOLD FOR | SALE DATE | REFERRAL | COMMENT |
|---|---|---|---|---|---|---|---|---|---|---|---|---|---|
| | | ADV/ | JENNY | SOME COMPANY | | | | 2 | ADV | $50.00 | 1/22/2003 | BLAH2 | |
| ONCE AN ORDER HAS BEEN SELECTED, VARIOUS OPTIONS WILL BECOME AVAILABLE | | ADV/ | JAKE | TSI DAVE RING | ALAN JACKSON | | | 2 | ADV | $100.00 | 9/10/2002 | TEST CURRENT CUSTOMER | |
| | | ADV/ | JAKE | TICKET SOLUTIONS | 10000 MARISON SUPER BOWL | 12/12/2002 | | 2 | ADV XXXXX | $125.00 | 1/16/2003 | CURRENT CUSTOMER | XXXXXXX XXXXXXX |
| | | ADV/ | JENNY | MOVIE STAR KEVIN | SUPER BOWL | 1/26/2003 | | 2 | XXX | $750.00 | | | |
| | | ADV/ | JAKE | MOVIE STAR KEVIN | SUPER BOWL | 1/26/2003 | | 2 | ADV LOWER | 2000.00 | 11/16/2002 | CURRENT CUSTOMER | LOWER LEVEL ENTRANCE |
| | | ADV/ | STEVE | HAMMER U. INC | SUPER BOWL | 2/2/2003 | | 2 | ADV | 2000.00 | 11/15/2002 | | |
| | | ADV/ | JAKE | MATT WATSON | 1994 THE TRIBUTE | 10/12/2003 | | 2 | ADV | $125.00 | 10/16/2002 | KQRC 98.9 THE | |

STATUS: OPEN
ASSIGNED TO: UNASSIGNED

VENUE MAP | PAYMENTS
ORDER COMPLETION | FILL ORDER
HIST/NOTES [F6] | PRINT [F4]
CANCEL ORDER

NOTES
XXXX

DELIVERY DATE:

4. PRE ORDERS
FILE PURCHASES SALES MANAGE REPORTS WINDOWS

HEADLINER: ROCKIN ROADHOUSE TOUR (CONCERTS)
EVENT:
VENUE:
DATE:
☐ SHOW EXPIRED [SEARCH] [CLEAR] ☐ SCHEDULE ONLY [SEARCH FOR EVENT]
☐ USE CTRL/SHIFT MULTISELECT

ULTRA USERS WILL BEGIN HERE

EVENT NOTES
SUBJECT | NOTES

[SELECT SELL]

PRICED EVENT CATEGORIES

| EVENT | VENUE | EVENT DATE | TIME | AVAL | CAT | PRICE | QTY | DESCR |
|---|---|---|---|---|---|---|---|---|
| "ROCKIN ROADHOUSE TOUR" | PEPSI ARENA (END STAGE) | 1/22/03 WE | TBA | 0 | A | $0.00 | 0 | FLOOR LEVEL FIRST 15 EL |
| "ROCKIN ROADHOUSE TOUR" | PEPSI ARENA (END STAGE) | 1/22/03 WE | TBA | 0 | C | $0.00 | 0 | LOWER LEVEL ELEVATED |
| "ROCKIN ROADHOUSE TOUR" | PEPSI ARENA (END STAGE) | 1/22/03 WE | TBA | 0 | D | $0.00 | 0 | LOWER LEVEL ELEVATED |
| "ROCKIN ROADHOUSE TOUR" | PEPSI ARENA (END STAGE) | 1/22/03 WE | TBA | 0 | E | $0.00 | 0 | LOWER LEVEL ELEVATED |
| "ROCKIN ROADHOUSE TOUR" | PEPSI ARENA (END STAGE) | 1/22/03 WE | TBA | 0 | F | $0.00 | 0 | UPPER LEVEL CLOSEST |
| "ROCKIN ROADHOUSE TOUR" | PEPSI ARENA (END STAGE) | 1/22/03 WE | TBA | 0 | G | $0.00 | 0 | UPPER LEVEL OPPOSITE |
| "ROCKIN ROADHOUSE TOUR" | BLUE CROSS ARENA (END STAGE) | 1/24/03 F | TBA | 0 | A | $0.00 | 0 | FLOOR LEVEL FIRST 15 |
| "ROCKIN ROADHOUSE TOUR" | BLUE CROSS ARENA (END STAGE) | 1/24/03 F | TBA | 0 | B | $0.00 | 0 | FLOOR LEVEL 16-40 ROWS |
| "ROCKIN ROADHOUSE TOUR" | BLUE CROSS ARENA (END STAGE) | 1/24/03 F | TBA | 0 | C | $0.00 | 0 | LOWER LEVEL ELEVATED |
| "ROCKIN ROADHOUSE TOUR" | BLUE CROSS ARENA (END STAGE) | 1/24/03 F | TBA | 0 | D | $0.00 | 0 | LOWER LEVEL ELEVATED |
| "ROCKIN ROADHOUSE TOUR" | BLUE CROSS ARENA (END STAGE) | 1/24/03 F | TBA | 0 | E | $0.00 | 0 | LOWER LEVEL ELEVATED |
| "ROCKIN ROADHOUSE TOUR" | FRAZE PAVILON-KETTERING, OH | 6/13/03 F | TBA | 0 | A | $0.00 | 0 | 1ST 10 ROWS FROM THE |
| "ROCKIN ROADHOUSE TOUR" | FRAZE PAVILON-KETTERING, OH | 6/13/03 F | TBA | 0 | B | $0.00 | 0 | ROWS 16 TO 25 FROM THE |
| "ROCKIN ROADHOUSE TOUR" | FRAZE PAVILON-KETTERING, OH | 6/13/03 F | TBA | 0 | C | $0.00 | 0 | TERRACE SEATING |
| "ROCKIN ROADHOUSE TOUR" | FRAZE PAVILON-KETTERING, OH | 6/13/03 F | TBA | 0 | D | $0.00 | 0 | LAWN SEATING |

[ADD TO PO] [ADD NOTES] [SELL] [ADVANCED SALE] [VENUE MAP (F2)]

FIG. 24

THE FOLLOWING WINDOWS ARE SPECIFIC TO DEPOSIT PAYMENT TYPE

ADD PAYMENT

DAVE RING (1216)   INVOICE #324
TSI                DATE: 1/22/2003   INVOICE TOTAL   xxxx
11500 COLLEGE                                        xxxx
315                                                  xxxx
OVERLAND PARK, KS 66210                              ADD
9133044751
APPLY SELECTED DEPOSIT | ADD DA   THE FOLLOWING WINDOWS   EXTRA
                                  ARE SPECIFIC TO DEPOSIT
DEPOSITS                          PAYMENT TYPE
DATE       | TYPE
1/10/2003  | REFUND
12/12/2002 | REFUND               SELECT "ADD DEPOSIT"

ADD DEPOSIT

AMOUNT: 75   PAYMENT: ▼
MEMO:                              ADD
DEPOSITS
DATE       | TYPE   | AMOUNT  | EXTRA INFO | MEMO
1/10/2003  | REFUND | $275.00 |            | STORE CREDIT FROM SALE #305
12/12/2002 |        |         |            | STORE CREDIT FROM SALE #295
           INSERT DEPOSIT
           AMOUNT AND
           PAYMENT TYPE

SELECT CREDIT CARD

CREDIT CARDS
D | CARD TYPE | NUMBER              | EXP     | DESCRIPTION
✓ |           |                     |         |
✓ | VISA      | 4444444444444444    | 4/4     | XXXXXXXX
✓ | VISA      | 4456-5565-5656-6565 | 05/2005 | CORPORATE
✓ | DISCOVER  | 654654654654654     | 05/2007 |

SELECT THE CREDIT         CANCEL | SELECT
CARD YOU WISH TO
BILL TO, THEN SELECT
THE "SELECT" BUTTON

*FIG. 25*

6. Exchange Brokers

| ⇦ ⇨ ○ 🗎 🏠 | 🖨 | 21010 ▽ | Fill Order |

Broker ID #1
Ticket Solutions
11900 College Blvd
Suite 315
Overland park, KS

Phone: 800-477-5285
Phone2: 913-384-4751
Fax: 913-451-7832

E-Mail: support@tickstsolutions.com
Web: http://www.ticketsolutions.com/

1 Ticket Solution
Overland park, KS

2 Great Seats
College Park, MD

3 Stage Front
Laurel, MD

Click on broker name to retrieve address, phone number and futher information for particular broker

2. Shared Inventory
Use to manage sharing tickets with the Exchange and Web. Use to export data to TicketsNow or Ticket Trader

| In | Web | Loc | Event | Venue | Date | Time | C | Qty | Section | Row | Seats | Price |
|---|---|---|---|---|---|---|---|---|---|---|---|---|
| ✓ | | | St Louis Blues vs Phoenix Coyotes | Savvis Center (Hockey) | 2/6/03 | 7:00 PM | | 4 | 303 | J | 09-12 | $55.00 |
| ✓ | ✓ | KC | North Carolina Tar Heels vs. Duke Blue | Dean E Smith Center | 3/9/03 | 4:00 PM | | 2 | 205A | W | 01-02 | $95.00 |

FIG. 30

3. PRE ORDER PRICES (ULTRA USER OPTION)
ALLOWS USER TO SET PRICES & QUANTITY FOR SPECIFIC CATEGORIES

FILE  PURCHASES  SALES  MANAGE  REPORTS  WINDOWS

EVENT/HEADLINER:

VENUE:

CATEGORY:

EVENT DATE:

DAY OF WEEK:
SUN
MON
TUE
WED
THU
FRI
SAT

CLOSE

VENUE MAP (F2)

SEARCH

NEW PRICE      NEW QUANTITY           UPDATE GROUP      EXCLUDE    REFRESH

| EVENT | EVENT DATE | VENUE | CATEGORY | PRICE | QUANTITY | EV |
|---|---|---|---|---|---|---|
| 2003 KANSAS CITY CHIEFS SEASON TICKETS | FRIDAY, 08/15/03 | ARROWHEAD STADIUM (FOOTBALL) | A | 0 | 0 | |
| 2003 KANSAS CITY CHIEFS SEASON TICKETS | FRIDAY, 08/15/03 | ARROWHEAD STADIUM (FOOTBALL) | C | 0 | 0 | |
| 2003 KANSAS CITY CHIEFS SEASON TICKETS | FRIDAY, 08/15/03 | ARROWHEAD STADIUM (FOOTBALL) | D | 0 | 0 | |
| 2003 KANSAS CITY CHIEFS SEASON TICKETS | FRIDAY, 08/15/03 | ARROWHEAD STADIUM (FOOTBALL) | E | 0 | 0 | |
| 2003 KANSAS CITY CHIEFS SEASON TICKETS | FRIDAY, 08/15/03 | ARROWHEAD STADIUM (FOOTBALL) | F | 0 | 0 | |

FIG. 31

5. Buyers/Credit cards
Modify & Add to Buyer/Credit Card list.

File  Purchase  Sales  Manage  Reports  Windows

Ticket Buyers

| ID | Buyer Name | Name | Address | City | State | Zip | Phone | Email |
|----|------------|------|---------|------|-------|-----|-------|-------|
| 70 | | | | | | | | |
| 73 | | | | | | | | |
| 117 | | | | | | | | |
| 32 | | | | | | | | |
| 108 | | | | | | | | |
| 78 | | | | | | | | |
| 30 | | | | | | | | |
| 136 | | | | | | | | |
| 105 | | | | | | | | |
| 62 | | | | | | | | |
| 66 | | | | | | | | |
| 125 | | | | | | | | |
| 128 | | | | | | | | |
| 130 | | | | | | | | |
| 34 | | | | | | | | |

Show All Cards   Print Card List   ☐ Show Deleted   Add New Buyer   Add New Card

Credit Cards

| Buyer ID | Category | Card Name | Card Two | Card Number | Card Exp | Credit Link | Date Num | Interest Rate | Name | Address | City | State |
|----------|----------|-----------|----------|-------------|----------|-------------|----------|---------------|------|---------|------|-------|
| | A | 210 | | | | | | | | | | |
| | A | 210 | | | | | | | | | | |
| | A | 210 | | | | | | | | | | |
| | A | 210 | | | | | | | | | | |

*FIG. 32*

9. Shopping Cart

| SALES REP | COMPUTER | TIMESTAMP | STATUS | EVENT | EVENT DATE | SECT | ROW | SEAT |
|---|---|---|---|---|---|---|---|---|
| ▷ | ELAINE | | SOLD | Super Bowl XXXVII - Oakland | 01/26/2003 | FIELD 34 | 24 | 03 |
| | ELAINE | | SOLD | Super Bowl XXXVII - Oakland | 01/26/2003 | FIELD 34 | 24 | 04 |
| | ELAINE | | | Super Bowl XXXVII - Oakland | 01/26/2003 | FIELD 34 | 24 | 01 |
| | ELAINE | | SOLD | Super Bowl XXXVII - Oakland | 01/26/2003 | FIELD 34 | 23 | 02 |

Complete List of Items in All Users Shopping Cart

Buttons: Refresh | By Sales Rep | By Event | By Entry Time | Close

Menu: File Purchase Sales Manage Reports Windows

FIG. 36

10. Exchange
  10.1 Broker to broker Settings
  Contains a list of all brokers that use the Exchange. Allows you to regulate the type of payment accepted for each broker and the Reserve Time.

| Broker | Payment | Reserve Hrs | Exclude | City | State |
|---|---|---|---|---|---|
| | Credit Card | | None | Chicago | IL |
| 2Tickets.com | COD | | None | Atlanta | GA |
| 24/7 (WebTickets.com) | Credit Card | | None | Atlanta | GA |
| A Worldwide Ticket co | COD | | None | Pompano Beach | FL |
| A1 Tickets | COD | | None | Carlos | CA |
| A1 Tickets (Houston) | COD | | None | Houston | TX |
| AAATIX (CHI) | AP | | None | Chicago | IL |
| AAATIX (AL) | AP | | None | Birmingham | AL |
| Access Entertainment inc. | Credit Card | | None | Toronto | OK |
| Ace Ticket (Boston) | AP | | None | Brockfield | MA |
| Ace Ticket Service (Chicago) | Credit Card | | None | Glenview | IL |
| ADVANTAGE SPORTS | COD | | None | RED BANK | NJ |
| Advantage Tickets | COD | | None | Adision | TX |
| All American Ticket Service | Credit Card | | None | Clairmount | NE |

Menu: File Purchase Sales Manage Reports Windows

Buttons: Refresh | Save

| FIG. 38 | FIG. 38A |
|---------|----------|
|         | FIG. 38B |

REPORTS
1. MAILING LISTS
USE VARIOUS FIELDS TO NARROW SEARCH CRITERIA

PURCHASES/SO — CATEGORIES — HEADNEAR — EXPORT TO FILE
SALES ●
ALL  ○
TYPE
CONCER
OTHER
SPORT

EXPORT EMAILS — PD REPORT
PRINT LABELS — REPORT

VENUES — EVENTS — BUILD — 0 CUSTOMERS

CUSTOMER STATE
XX
AB
AE
AK
AL
ALB
AP
AR
ARK
AUS
AZ

CUSTOMER CITY
XX
0
00000
1111
123
1LEAWOOD
2
222222
3213213
4 SEASONS

CUSTOMER
OF TRANSACTIONS: 0
MONEY SPENT: 0
CUSTOMER TYPE
AGENT TRAVEL
AREA GUIDE
BROKER
BUYER
CIRCLES - CENTURION
CIRCLES - MAIN

SALES REP
[ABILICOR] WEB. 116
[CIRCLES] WEB. 1
[CIRCLES] WEB. 10
[CIRCLES] WEB. 11
[CIRCLES] WEB. 119
[CIRCLES] WEB. 120
[CIRCLES] WEB. 124
[CIRCLES] WEB. 142
[CIRCLES] WEB. 152
[CIRCLES] WEB. 159

REFERRAL
SELECT CAMPAIGN
SITEWEB
HE BAY

COMOVERTURE
7 JUST SENT IN A MON!
101.1 FOX (KANSAS CITY)
101.7 KGOZ (XXXXX MC)
101.7 KGOZ (TRENT ON )

*FIG. 38A*

3. EVENT REPORTS
3.1 EVENT RANGE
SELECT DATE RANGE, SORTS BY EVENT NAME

1/15/2003

EVENT REPORT

| DATE | EVENT | VENUE | SOLD | AVAILABLE |
|---|---|---|---|---|
| 1/12/03 | CHICAGO BLACKHAWKS VS NASHVILB PROD | UNITED CENTER (HOCKEY) | | 4 |
| 12/16/02 | CHICAGO BULLS VS BOSTON CELTICS | UNITED CENTER (BASKETBALL) | | 2 |
| 12/27/02 | CHICAGO BULLS VS MINNEEOTS TIMBERWOL | UNITED CENTER (BASKETBALL) | | 2 |
| 1/13/03 | CHICAGO BULLS VS NEW YORK KINKS | UNITED CENTER (BASKETBALL) | | 2 |
| 12/31/02 | CHICAGO BULLS VS PORTLAND TRAIL BLAZERS | UNITED CENTER (BASKETBALL) | | 2 |
| 12/18/02 | CHICAGO BULLS VS TORONTO RAPTORS | UNITED CENTER (BASKETBALL) | | 2 |
| 1/6/03 | CHICAGO BULLS VS UTAH JAZZ | UNITED CENTER (BASKETBALL) | 2 | |
| 12/22/02 | KANSAS CITY CHIEFS VS SUN DIEGO CHARG | ARROWHEAD STADIUM (FOOTBALL) | 16 | 35 |
| 1/4/03 | LOS ANGELES KINGS VS DOLLAR STARS | STAPLES CENTER (HOCKEY) | | 5 |
| 12/17/02 | LOS ANGELES KINGS VS ST LOUIS BLUES | STAPLES CENTER (HOCKEY) | 5 | |
| 1/10/03 | LOS ANGELES LAKES VS CLEVELAND CAVE | STAPLES CENTER (BASKETBALL) | 2 | |
| 1/12/03 | LOS ANGELES LAKES VS MIAMI HEAT | STAPLES CENTER (BASKETBALL) | | 4 |
| 12/30/02 | MISSOURI TIGERS VS VAMPIRES CREADER | HEARNES CENTER (BASKETBALL) | | 4 |
| 12/28/02 | NEW ENGLAND PATRIOTS VS MIAMI DOLOB | GILLETTE STADIUM (FOOTBALL) | 5 | |

FIG. 39

3.2 CURRENT EVENTS
AUTOMATICALLY GENERATES

EVENT REPORT

1/15/2003

| DATE | EVENT | VENUE | SOLD | AVAILABLE |
|------|-------|-------|------|-----------|
| 3/21/03 | 10 GATES DANCING | NATIONAL ARTS CENTRE | | 3 |
| 3/20/03 | 10 GATES DANCING/TEDD ROBINSON | NATIONAL ARTS CENTRE | | 4 |
| 3/22/03 | 10 GATES DANCING/TEDD ROBINSON | NATIONAL ARTS CENTRE | 4 | 5 |
| 2/15/03 | 2003 AMA SUPERCROSS | HHH METHADOME | | 5 |
| 3/29/03 | 2003 AMA SUPERCROSS | ROBERT ARENA | | 3 |
| 1/23/03 | CHICAGO BLACKHAWKS VS ST LOUIS BLUES | UNITED CENTER (HOCKEY) | | 4 |

FIG. 40

4. Inventory
4.1 Sold Tickets Search Utility
Provide search criteria
Select event by highlighting the row

| Invoice | EVENT | VENUE | Purch Date | Event Date | Section | Row | Seat |
|---|---|---|---|---|---|---|---|
| 88494 | NFL Pro Bowl | Aloha Stadium | 1/17/2001 | 2/4/2001 | C | 13 | 16 |
| 88914 | NFL Pro Bowl | Aloha Stadium | 1/26/2001 | 2/4/2001 | PP | 08 | 04 |
| 88514 | NFL Pro Bowl | Aloha Stadium | 1/26/2001 | 2/4/2001 | PP | 08 | 05 |
| 88926 | NFL Pro Bowl | Aloha Stadium | 1/26/2001 | 2/4/2001 | G | 31 | 03 |
| 88926 | NFL Pro Bowl | Aloha Stadium | 1/26/2001 | 2/4/2001 | G | 31 | 04 |

4.2 Reserved Ticket List
Automatically generates report.

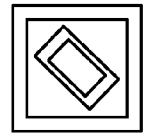

Reserved Tickets

| Event ID | Section | Row | Seat | | | Cost | List | Reserved |
|---|---|---|---|---|---|---|---|---|
| 103,677 | Boston Red Sox vs Anaheim Angels | | | Fenway Park | | Monday August 21, 2000 | | |
| | 24 | EE | 1 | DUPLICATE | TICKETS | $0.00 | $155.00 | $155.00 |
| 103,706 | Boston Red Sox vs Seattle Mariners | | | Fenway Park | | Saturday September 2, 2000 | | |
| | 11 | CC | 07 | DUPLICATE | TICKETS | $0.00 | $95.00 | $0.00 |
| | 11 | CC | 08 | DUPLICATE | TICKETS | $0.00 | $95.00 | $0.00 |
| 212,639 | Bruce Springsteen and the E Street Band | | | Dunkin Donuts Center (End Stage) | | Monday March 10, 2003 | | |
| | 101# | C | 05 | KYLE | STONE | $82.65 | $0.00 | $0.00 |
| | 101# | C | 06 | KYLE | STONE | $82.65 | $0.00 | $0.00 |
| | 103# | EE | 01 | KYLE | STONE | $81.83 | $0.00 | $0.00 |
| | 103# | EE | 02 | KYLE | STONE | $81.83 | $0.00 | $0.00 |
| | 103# | EE | 03 | KYLE | STONE | $81.83 | $0.00 | $0.00 |
| | 103# | EE | 04 | KYLE | STONE | $81.83 | $0.00 | $0.00 |

*FIG. 43*

4.3 Expired Inventory
Automatically generates report

*Expired Inventory*

*College World Series - Game 3 (Remembahim Stadium)*    Monday, June 17, 2002    Count: 2

| Row | Seat | Count |
|---|---|---|
| BB | 03 | 2 |
| 10 | | |

*Minnesota Vikings vs New York Giants (HHH Metrodome (Fwd))*    Sunday, November 10, 2002    Count: 30

| Row | Seat | Count |
|---|---|---|
| 120 | 09 | 2 |
| 21 | | |

*FIG. 44*

4.4 PO Tickets.
Automatically generates report

| | | | | | | | |
|---|---|---|---|---|---|---|---|
| 1/13/2003 | | | | | | | |
| Event ID | Section | Row | Seat | | | | |
| 1,712 2002 Mainstay Independence Bowl - | | | | Independence Bowl Stadium | Friday, December 27, 2002 | | |
| Nebraska Cornhuskers vs Mississippi Rebels | | | | | Cost | List | Sell |
| 113 | 11 | 01 | | | $35.00 | $0.00 | $175.0 |
| 113 | 11 | 02 | | | $35.00 | $0.00 | $175.0 |
| 113 | 11 | 03 | | | $35.00 | $0.00 | $150.0 |
| 113 | 11 | 04 | | | $35.00 | $0.00 | $150.0 |
| 113 | 11 | 05 | | | $35.00 | $0.00 | $150.0 |

*FIG. 45*

4.5 Sold Tickets
Automatically generates report.

*Sold Tickets Report*

| Section | Row | Seat | Sold Date | Sold $$ | Rep | Inv # |
|---|---|---|---|---|---|---|
| 2003 AMA Supercross | | | HHH Metrodome (Football) | | Saturday, February 15, 2003 TBA | |
| 133 | 05 | 15 | 1/13/03 | $95.00 | | 155,700 |
| 133 | 05 | 16 | 1/13/03 | $95.00 | | 155,701 |
| 2003 NFL Pro Bowl | | | Aloha Stadium | | Saturday September 2, 2000 1:00 PM | |
| ORANGE K | 14 | 13 | 1/15/03 | $250.00 | | 155,820 |

4.6 Fax List
Provide Search Criteria

◆ Event Picker           _ ☐ X

Headliner: [ ▽ ]    Event: [ ]
Venue: [ ▽ ]    Date: [ ]

[ Search ] [ Print ]    ☐ Show Deleted    ☐ Show Expired

| | Event | Venue | Event Date | Event Time |
|---|---|---|---|---|
| ▷ | AFC Conference Championship - Oakland | Network Associates | Sunday, 01/19/03 | 3:30 PM |
| | NFC Conference Championship | Veterans Stadium | Sunday, 01/19/03 | 3:00 PM |
| | Super Bowl Package | Qualcomm Stadium | Thursday, 01/23/03 | TBA |
| | Championship Package 1/23/03 | Gaslamp Plaza Suites | Thursday, 01/23/03 | TBA |

Select event by highlighting. Select multiple events by suppressing the Control
or Shift keys while highlighting with mouse.

*FIG. 47*

Select Print
Prompt "Include only shared ticket?, select "yes" or "no"

Ticket Solutions, Inc.
11900 College Blvd. Suite 315
Overland Park, KS 66210

Phone: (913)384-4751
Fax: 913-451-7832

January 26, 2003

Super Bowl XXXVII at Qualcomm Stadium (Football)
San Diego, CA

3:00 PM

| COUNT | SECTION | ROW | FACE | RETAIL |
|---|---|---|---|---|
| 2 | PLAZA 06 | 12 | $400.00 | $4,750.00 |
| 5 | FIELD 06 | 22 | $0.00 | $4,500.00 |

*FIG. 48*

4.7 # Days Fax List
Prompt "How many days?"
Prompt "Include only shared tickets?"

4.8 Open Inventory
4.9 Open Inventory (Selected Events)
4.10 Open Inventory (Not Categorized)
    Automatically generates report 5. Registers
5.1 FedEx History

FedEx Ship History

| Invoice | Comp. Date | Amount | Ship To | Payment | Shipping Type | Tracking # | Bill To |
|---|---|---|---|---|---|---|---|
| 155590 | 1/13/2003 | $3,185.00 | | Credit | FedEX Standard | 7900135252705 | Starcard |
| 155417 | 1/15/2003 | $2,277.76 | | Credit | FedEX Standard | 790677847563 | Standard |
| 155920 | 1/15/2003 | $6,000.00 | | COD U | FedEX Standard | 790077342000 | Recipient |
| 155621 | 1/15/2003 | $1,106.00 | | Credit | FedEX Standard | 790185633810 | Standard |
| 155178 | 1/17/2003 | $825.00 | | Credit | FedEX Next Day | 790135486898 | Starcard |
| 155727 | 1/15/2003 | $3,115.00 | | Credit | FedEX Priority | 790185628980 | Standard |
| 155315 | 1/15/2003 | $215.00 | | Credit | FedEX Priority | 790577648865 | Starcard |
| 155680 | 1/15/2003 | $765.00 | | Credit | FedEX Standard | 791277949777 | Standard |
| 155707 | 1/15/2003 | $214.00 | | Credit | FedEX Standard | 791835559998 | Starcard |
| 155807 | 1/17/2003 | $1,740.00 | | Credit | FedEX Standard | 791277648446 | Standard |
| 155468 | 1/15/2003 | $199.00 | | Multiple | FedEX Standard | 790135760269 | Starcard |
| 155818 | 1/15/2003 | $500.00 | | AR | FedEX Standard | 790185534284 | Recipient |
| 155726 | 1/15/2003 | $6,20000 | | COD U | FedEX Standard | 791244109100 | Recipient |
| 155662 | 1/15/2003 | $905.00 | | Multiple | FedEX Standard | 790677813154 | Standard |
| 155801 | 1/15/2003 | $3,185.00 | | Credit | FedEX Standard | 700135854507 | Starcard |
| 152929 | 1/15/2003 | $1,115.00 | | Credit | FedEX Standard | 791277433231 | Standard |
| 155100 | 1/15/2003 | $5,285.00 | | Credit | FedEX Standard | 700105577022 | Standard |
| 155829 | 1/15/2003 | $6,300.00 | | AR | FedEX Next Day | 791277585069 | Standard |
| 155800 | 1/15/2003 | $515.00 | | Credit | FedEX Standard | 733185400134 | Starcard |
| 155736 | 1/15/2003 | $1,566.00 | | Credit | FedEX Priority | 790185623680 | Standard |
| 15158 | 1/17/2003 | $417.00 | | Credit | FedEX Standard | 730677773908 | Starcard |

Delete | Track | Refresh 01/15/03 | Fedex Report | Close

FIG. 51

5.2 Invoice Register
Able to modify search criteria. Select Refresh after modifying the search criteria. Select an item by highlighting the row. Select Print, this will generate an invoice.

Date Range: 01/15/03 to 01/15/03    Sales Rep Filter    Referral Filter

ALL SALES    Refresh    Print (F4)    (Circles) Web - 1    DOMOVEATURE
                                       (Circles) Web - 10   T01.1 FDX (KANSAS CITY0
                                       (Circles) Web - 11   T07.7 KFLZ (St. Louis)

Invoices(F3 to Sort F8 to find # F9 to find P0)

| ID | Type | SalesRep | Event Venue | Event Date | Qty | Seating | Sold For | Cost | Profit | Margin |
|---|---|---|---|---|---|---|---|---|---|---|
| 55867 | COMPLETE | | Toronto Maple Leafs v4 | 2/8/2003 | 3 | DAT A | $350.00 | | | |
| 55867 | INVENTORY | | Toronto Maple Leafs v5 | 2/8/2003 | 1 | 319 STD, ROW STD | $120.00 | $82.10 | $37.50 | 32% |
| 55867 | INVENTORY | | Toronto Maple Leafs v6 | 2/8/2003 | 2 | 320 STD, ROW STD | $240.00 | $164.20 | $76.80 | 32% |
| 55866 | INVENTORY | | St Louis Blues vs Detroit | 3/22/2003 | 2 | 117, ROW A, SEATS | $500.00 | $220.00 | $280.00 | 56% |
| 55865 | INVENTORY | | Guns N Roses | 12/13/2002 | 2 | FL1, ROW 12, SEATS | $142.06 | $142.06 | $0.00 | |
| 55863 | INVENTORY | | Guns N Roses | 12/13/2002 | 2 | FL1, ROW 12, SEATS | $142.06 | $142.06 | $00.00 | 0% |
| 55862 | INVENTORY | | Guns N Roses | 12/13/2002 | 2 | FL2, ROW 09, SEATS | $142.06 | $142.06 | $0.01 | 0% |
| 55861 | INVENTORY | | Guns N Roses | 12/13/2002 | 2 | FL3, ROW 06, SEATS | $142.06 | $142.06 | $0.01 | 0% |
| 55860 | PRICED | | Kansas Jayhawks vs | 1/25/2003 | 4 | DAT A | $2,400.00 | | | |
| 55859 | PRICED | | UAW Daimler Chrysler 400 | 3/2/2003 | 1 | DAT H | $175.00 | | | |
| 55858 | INVENTORY | | Mamma Mia | 1/18/2003 | 2 | A ROC. ROW B, SEATS | $400.00 | $130.00 | $270.00 | 67% |
| 55857 | INVENTORY | | Guns N Roses | 12/13/2003 | 2 | FL3, ROW 03, SEATS | $142.06 | $142.06 | $0.01 | 0% |
| 55856 | INVENTORY | | Guns N Roses | 12/13/2003 | 2 | FL3, ROW 05, SEATS | $142.06 | $142.06 | $0.01 | 0% |
| 55855 | INVENTORY | | 2003 NFL Pro Bowl | 2/2/2003 | 2 | BLUE H, ROW 45 | $370.00 | $200.00 | $170.00 | 46% |
| 55854 | PRICED | | Super Bowl XXVI | 1/26/2003 | 4 | DAT H | $6,600.00 | | | |
| 55853 | INVENTORY | | George Strait | 12/13/2003 | 6 | 108, ROW M, SEATS | $800.00 | $417.40 | $482.60 | 54% |
| 55852 | PRICED | | Belmont Stakes | 6/8/2003 | 2 | DAT B | $700.00 | | | |
| 55851 | PRICED | | Crave DuSoliel - O | 1/18/2003 | 3 | DAT A | $900.00 | | | |
| 55851 | PRICED | | Danny Gans | 1/16/2003 | 3 | DAT A | $800.00 | | | |
| 55850 | PRICED | | George Strait | 2/13/2003 | 5 | DAT C | $750.00 | | | |

Inventory Sales                Advanced Sales        ● Sale Date    ○ Completion Date
Total: $44,794 Profit: $12,175.00    Total: $96,090

FIG. 52

5.3 Purchase Order Register
Able to modify search criteria. Select Refresh after modifying search criteria. Select an item by highlighting the row. Select Print, this will generate a Complete Purchase Order.

| File | Purchase | Sales | Manage | Reports | Windows | | | | |
|---|---|---|---|---|---|---|---|---|---|
| Date of POs to Show: | | 12/17/02 | | Refresh | | Print (F4) | | F3 to Sort | |
| ID | Status | Sales Rep | Payment Type | PO Total | Event Venue | Event Date | Qty | Cost | Vendor |
| 41622 | Complete | | Credit Card | $179.55 | Yanni | 05/03/03 | 2 | $89.78 | TICKETMASTER |
| 41754 | Complete | | Credit Card | $162.50 | Shakira | 01/28/03 | 2 | $81.25 | TICKETMASTER |
| 41755 | Complete | | Credit Card | $162.50 | Shakira | 01/28/03 | 2 | $81.25 | TICKETMASTER |
| 41786 | Complete | | Credit Card | $205.00 | 2003 Nokia Sugar Bowl | 01/01/03 | 2 | $102.50 | TICKETMASTER |
| 41788 | Complete | | Credit Card | $205.00 | 2003 Nokia Sugar Bowl | 01/01/03 | 2 | $102.50 | TICKETMASTER |
| 41789 | Complete | | Credit Card | $205.00 | 2003 Nokia Sugar Bowl | 01/01/03 | 2 | $102.50 | TICKETMASTER |
| 41827 | Complete | | Credit Card | $355.75 | Cher | 03/13/03 | 4 | $88.94 | TICKETMASTER |
| 41865 | Complete | | Credit Card | $202.40 | Alan Jackson | 02/07/03 | 4 | $50.00 | TICKETMASTER |
| 41882 | Complete | | Credit Card | $102.70 | Alan Jackson | 02/07/03 | 2 | $51.35 | TICKETMASTER |

FIG. 53

5.4 WEB SALES REGISTER
ABLE TO MODIFY SEARCH CRITERIA. SELECT REFRESH AFTER MODIFYING THE SEARCH CRITERIA. SELECT AN ITEM BY HIGHLIGHTING THE ROW. SELECT PRINT, THIS WILL GENERATE A PRICED EVENT SALE REPORT

FILE  PURCHASES  SALES  MANAGE  REPORTS  WINDOWS

| | TYPE | FIRST NAME | LAST NAME | TOTAL | PUNCH DATE | SALES REP | COMPLETION DATE | TRACKING & |
|---|---|---|---|---|---|---|---|---|
| 155951 | PRICED | HOPE | GREEN | $65.00 | 1/17/2003 9:39:27 AM | | | |

| PRINT [F4] | HISTORY [F6] | REFRESH [F5] | FIND [CTRL+F] | START DATE | JANUARY 17, 2003 |

*FIG. 54*

5.6 EXCHANGE TRANSACTIONS

← → 🖼 🗈 🏠 | 21010 ▽ | FBI ORDER |

DISPLAY: | ALL TRANSACTIONS ▽ | BROKER TRANSACTIONAL DETAILS

| DATE | TRANSACTION | DATE | EVENT_ID | EVENT DATE/TIME | EVENT (VENUE) | QTY (SECT. ROW) | BUY PRICE/SOLD PRICE | XXX | XXX | CUSTOMER CONF# |
|---|---|---|---|---|---|---|---|---|---|---|
| 1/16/2003 1:34:32 PM | TICKETS SOLD TO CUSTOMER | WEB | 187932 | 4/1/2003 TAs | JEEUS CNNSE SUPERSOS (FEATHER FUY THEATER (GA)) | 2 (ORCHC P) | $85 $120 | 0 | 0 | EXS1547-ADV |

*FIG. 55*

6. SALES REPORTS
6.1 DAILY SALES BY EVENT
SELECT DATE RANGE, SORTS BY EVENT NAME

EVENT SALES

2003 AMA SUPERCROSS ((HHH METRODOME (FOOTBALL)) SATURDAY, FEBRUARY 15, 2003 TBA

| INS# | SOLD | REP | CUSTOMER | LOCATION | SOLD | COST | PROFIT |
|---|---|---|---|---|---|---|---|
| 155700 | 1/13/03 | AMY HORTON | CHARLES DUNLAP | SECTION: 133 ROW:05 SEATS: 15 TO 16 | 190.00 | 130.00 | 60.00 |
| | | | | | 2 190.00 | 130.00 | 60.00 |

2003 FEDEX ORANGE HOWL-IEWA HOWKEYS VS USC TROJANS (PRO PLAYER STADIUM (FOOTBALL))
THURSDAY, JANUARY 2, 2003 8:00 PM

| INS# | SOLD | REP | CUSTOMER | LOCATION | SOLD | COST | PROFIT |
|---|---|---|---|---|---|---|---|
| 155187 | 1/2/03 | JALCE | WRITE OFF | SECTION: 44 ROW:04 SEATS: 20 TO 20 | 0.00 | 50.00 | (50.00) |
| 155187 | 1/2/03 | JALCE | WRITE OFF | SECTION: PKG ROW;ORANGE SEATS: 170 TO 171 | 0.00 | 0.00 | 0.00 |
| 155187 | 1/2/03 | JALCE | WRITE OFF | SECTION: TAILGATE ROW;PANTY SEATS: 187 TO | 0.00 | 0.00 | 0.00 |
| | | | | | 5 0.00 | 50.00 | (50.00) |

2003 ROSE BOWL-OKLAHOMA SOONERS VS WASHINGTON STATE COUGARS (ROSE BOWL)
WEDNESDAY, JANUARY 1, 2003 2:00 PM

| INS# | SOLD | REP | CUSTOMER | LOCATION | SOLD | COST | PROFIT |
|---|---|---|---|---|---|---|---|
| 155175 | 1/1/03 | TIRJ | OERARD O ESQUIVEL | SECTION: 09 ROW:12 SEATS: 01 TO 02 | 150.00 | 50.00 | 100.00 |
| | | | | | 2 150.00 | 50.00 | 100.00 |

TOTAL TICKETS PER EVENT — TOTAL SOLD, COST, PROFIT PER EVENT

YAMNI (GAYLORD ENTERTAINMENT (END STAGE)) WEDNESDAY, MARCH 12, 2003 7:30 PM

| INS# | SOLD | REP | CUSTOMER | LOCATION | SOLD | COST | PROFIT |
|---|---|---|---|---|---|---|---|
| 155166 | 1/1/03 | | | SECTION: 02 ROW:A SEATS: 02 TO 06 | 420.00 | 300.00 | 120.00 |
| | | | | | 2 420.00 | 300.00 | 120.00 |

REPORT TOTALS → 1,002  282,751.97  210,357.68  72,384.34

TOTAL TICKETS FOR DATE RANGE — TOTAL SOLD, COST, PROFIT FOR DATE RANGE

6.7 Chicago Sales Tax Report
Select Date Range
Prompt "Show sales you charged $0.00 for?", select yes or no
Prompt "Do you charge tax on handling?", select yes or no
Prompt "Do you charge tax on shipping?", select yes or no

| Theatre | Qty | Total Price | Face | Taxable | Should be Taxed | Amt Taxed for entire sale | Shipping | Handling |
|---|---|---|---|---|---|---|---|---|
| Web | | | | | | | | |
| | 155,667 | 2 | 40.00 | 0.00 | 435.00 | $13.05 | 0.00 | 0.00 | 0.27 |
| | | | | | | $6.00 | 15.00 | |
| | | | | | | $6.00 | | |

*FIG. 62*

6.9 Event Sales
Provide search criteria.

| Event Picker | | | □ X |
|---|---|---|---|
| Headliner: [NFL Post Season (NFL)] ▼ Event: [ ] | | | |
| Venue: [ ] ▼ Date: [ ] | | | |
| [Search] [Print] ☐ Show Deleted ☐ Show Expired | | | |

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27 | Ramada Inn South | Thursday, 01/23/03 | 3:00 PM |
| Hyatt Regency Rooms 1/23 - 1/27 | Hyatt Regency (San | Sunday, 01/26/03 | 3:00 PM |
| Super Bowl XXXVII | Qualcomm Stadium | Monday, 01/27/03 | TBA |
| Super Bowl Package extra night | Qualcomm Stadium | Sunday, 02/01/04 | TBA |
| Super Bowl XXXVIII | Reliant Stadium (Football) | | |
| Super Bowl XL | | Sunday, 02/05/06 | TBA |

Select event by highlighting . Select multiple events by suppressing the Control or
Shift keys while highlighting with mouse.

FIG. 66

6.10 Event Sales Timeline (Weekly)
6.11 Event Sales Timeline (Daily)

| Event Picker | | | | |
|---|---|---|---|---|
| Headliner: | [NFL Post Season (NFL)] | | Event: | |
| Venue: | | | Date: | |
| | Search | Print | ☐ Show Deleted ☐ Show Expired | |

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Bastamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Thursday, 01/23/03 | TBA |
| Hyatt Regency Rooms 1/23 - 1/27 | Hyatt Regency (San | Thursday, 01/23/03 | 3:00 PM |
| Super Bowl XXXVII | Qualcomm Stadium | Sunday, 01/26/03 | 3:00 PM |
| Super Bowl Package extra night | Qualcomm Stadium | Monday, 01/27/03 | TBA |
| Super Bowl XXXVIII | Reliant Stadium (Football) | Sunday, 02/01/04 | TBA |
| Super Bowl XL | | Sunday, 02/05/06 | TBA |

Provide Search criteria.

Select event by highlighting. Select Multiple events by suppressing the Control or Shift keys while highlighting with mouse.

FIG. 68

Select the Print button to generate the report

Weekly Sales by Category

Event ID: 110,289  Super Bowl XXXVII  Sunday, January 26, 2003
                   Qualcomm Stadium (Football)  3:00 PM Week 3  Monday, January 13, 2003

| | | Qty | Ave. Prk | Ave. Cost | Profit |
|---|---|---|---|---|---|
| Lower Level Goal to 30 Yard Line | B | 27 | $2,985.19 | $2,221.48 | $20,320.00 |
| Lower Level Corner Endzone | G | 16 | $1,901.56 | $1,525.00 | $6,025.00 |
| Lower Level Endzone | D | 8 | $1,806.25 | $1,176.25 | $5,040.00 |
| Upper Level Endzone | H | 10 | $1,450.00 | $1,200.00 | $2,500.00 |
| | | 61 | $139,973.00 | $106,060.00 | $33,915.00 |

6.13.2 Selected Event

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Thursday, 01/23/03 | TBA |
| Hyatt Regency Rooms 1/23 - 1/27 | Hyatt Regency/San | Thursday, 01/23/03 | 3:00 PM |
| Super Bowl XXXVII | Qualcomm Stadium | Sunday, 01/26/03 | 3:00 PM |
| Super Bowl Package extra night | Qualcomm Stadium | Monday, 01/27/03 | TBA |
| Super Bowl XXXVIII | Reliant Stadium (Football) | Sunday, 02/01/04 | TBA |
| Super Bowl XL | Ford Field | Sunday, 02/05/06 | TBA |

Provide Search criteria.

Select event by highlighting. Select Multiple events by suppressing the Control of Shift keys while highlighting with mouse.

*FIG. 73*

Daily Sales Report

| Date | Sell Price | Cost | Profit |
|---|---|---|---|
| Tuesday, January 14, 2003 | 90,965.00 | 67,968.00 | 22,997.00 |
| Monday, January 13, 2003 | 73,860.00 | 33,184.41 | 23,675.59 |
| Friday, January 10, 2003 | 22,105.00 | 14,834.58 | 7,270.42 |
| Thursday, January 9, 2003 | 29,343.25 | 18,927.22 | 10,336.03 |
| Wednesday, January 8, 2003 | 18,675.00 | 11,012.57 | 7,662.43 |
| Tuesday, January 7, 2003 | 27,690.00 | 18,040.32 | 9,649.68 |
| Monday, January 6, 2003 | 30,317.30 | 27,292.71 | 3,024.60 |
| Saturday, January 4, 2003 | 2,015.00 | 1,390.00 | 625.00 |

FIG. 74

6.17. *Custom with SalesReps/Dates*

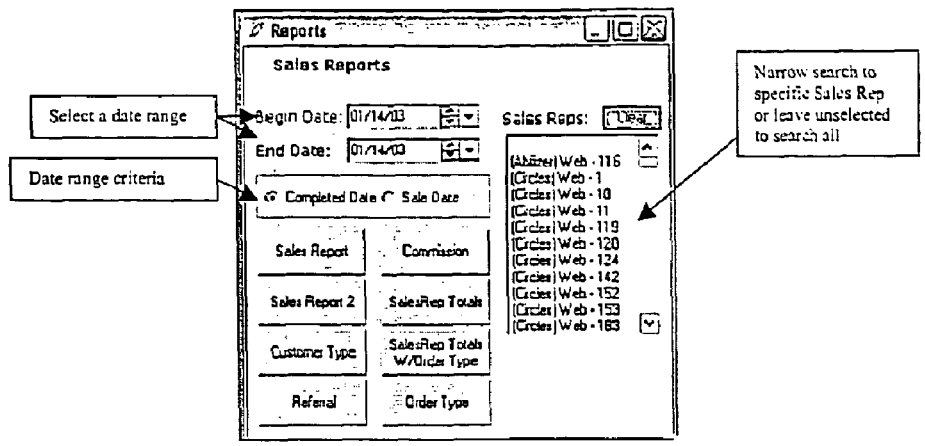

FIG. 75

| | | Sales Report | | Sales Report provides sales information broken down by Sale Rep. *Customer Type. Referral. Commission and Order Type Reports provide similar information. | | | |
|---|---|---|---|---|---|---|---|

(Overture) Web
Jimmy Buffett (American Airlines Arena (End Stage)) Thursday, February 13, 2003 8:00 PM        Sold      Cost     Projected
155745         Sold:      13-Jan-03  Count: 4
               Completed  14-Jan-03  Section: 104 Row: 21 Seats: 03 to 06        $560.00  $396.00  $164.00

$560.00  $396.00  $164.00
                                                            SalesRep Totals:     $560.00  $396.00  $164.00

SalesRep Totals
*SalesRep Totals w/Order Type provides similar information

*Sales Report by Sales Representative*
01/04/03

| #Sales | #Txkeg | Total Cost | Total Price | Profit | Markup % | Margin % | Shipping | Fees | Tax | Discount |
|---|---|---|---|---|---|---|---|---|---|---|
| 1 | 4 | 396.00 | 560.00 | 164.00 | 41.52% | 29.34% | 15.00 | 0.00 | 0.00 | 0.00 |
| 4 | 13 | 2,157.00 | 2,315.00 | 652.00 | 30.52% | 23.38% | 60.00 | 0.00 | 0.00 | 0.00 |
| 1 | 2 | 2,500.00 | 3,500.00 | 200.00 | 29.64% | 22.36% | 0.00 | 0.00 | 0.00 | 0.00 |
| 1 | 2 | 2,500.00 | 3,500.00 | 200.00 | 29.64% | 22.36% | 0.00 | 0.00 | 0.00 | 0.00 |

FIG. 76

MANAGING TRANSACTIONS OF BROKER AFFILIATES

CROSS-REFERENCE TO RELATED APPLICATIONS

This patent application is a continuation of U.S. patent application Ser. No. 12/876,216 titled "MANAGING TRANSACTIONS OF BROKER AFFILIATES" filed on Sep. 9, 2010, which is a continuation of U.S. patent application Ser. No. 10/606,086 titled "METHODS AND COMPUTER-READABLE STORAGE DEVICES FOR MANAGING TRANSACTIONS WITH MULTIPLE BROKER AFFILIATES" filed on Jun. 25, 2003, which issued as U.S. Pat. No. 7,792,700 on Sep. 7, 2010, and which are incorporated herein by reference as part of the present disclosure.

BACKGROUND OF THE INVENTION

1. Field of the Invention

The present invention relates generally to automated transaction management, and in particular to a system and method for managing e-commerce transactions using an Internet (world wide web) based distributed network with a central exchange server networked to multiple broker computers.

2. Discussion of the Related Art

Various systems and methodologies have previously been developed for managing commercial transactions involving buyers, sellers, brokers, agents and other participants. The objects of the transactions can comprise goods and/or services.

The Internet (world wide web) has produced many opportunities for transacting business quickly and efficiently, as compared to more traditional business transaction methods. Transacting business via the Internet is sometimes referred to as "electronic commerce" or "e-commerce". Among its many advantages is the ability to provide virtually instantaneous, i.e. "real-time", communication among the participants. Orders can be instantly taken and processed online from Internet-linked terminals located all over the world.

The instantaneous, real-time aspect of e-commerce particularly lends itself to date-sensitive transactions, i.e. those presenting relatively limited opportunities for concluding transactions. For example, tickets to date-specific events and for date-specific services generally become worthless after expiration. Sporting and entertainment events are typically booked months in advance and tickets are presold through various distribution trade channels and ticket outlets, including e-commerce. The sports and entertainment industries allocate considerable resources to matching ticket demand and supply in order to maximize event attendance and revenue. Although large portions of available seats are presold months in advance, tickets are often in high demand up to the last minute. Therefore, an efficient distribution model for tickets to date-specific events and services would match sellers holding tickets with buyers in the largest possible customer base, and provide instantaneous, real-time access to such information.

Ticket brokers operating in many areas buy and sell tickets to various sports and entertainment events. Although the markets tend to be somewhat localized to particular venues, transactions are routinely done on a national or even international basis. For example, through their web pages ticket brokers may encounter opportunities to purchase tickets from sellers and sell tickets to buyers in global markets. Moreover, ticket distribution lends itself to broker-to-broker ("B2B") transactions as different brokers trade amongst themselves in order to fulfill specific customer requests. However, automating ticket transactions among brokers with different inventories and marketing objectives can involve handling large amounts of data. A need therefore exists for automating the management of e-commerce transactions involving tickets and other goods and services.

Heretofore there has not been available a transaction management system and method with the advantages and features of the present invention.

BRIEF DESCRIPTION OF THE INVENTION

In the practice of one aspect of the present invention, a system is provided for managing commercial transactions. The system includes a distributed network comprising a central exchange computer linked to multiple customer/vendor computer systems. Transaction objects comprising goods and/or services can be bought and sold using various flexible, redefinable rules governing various aspects of the transactions. The system is adapted to interface with other automated business systems, including shipping and bookkeeping.

BRIEF DESCRIPTION OF THE DRAWINGS

The drawings constitute a part of this specification and include exemplary embodiments of the present invention and illustrate various objects and features thereof.

FIG. 3 is a table showing broker transaction rules.

FIG. 6 is a block diagram showing components of the system.

FIGS. 7-9 are screen displays from a special order system (SOS) showing examples of functions.

FIG. 10 is a flowchart of a point-of-sale (POS) system transaction.

FIGS. 11-76 are screen displays from the point-of-sale (POS) system for use by a broker affiliated with the system.

DETAILED DESCRIPTION OF THE INVENTION

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
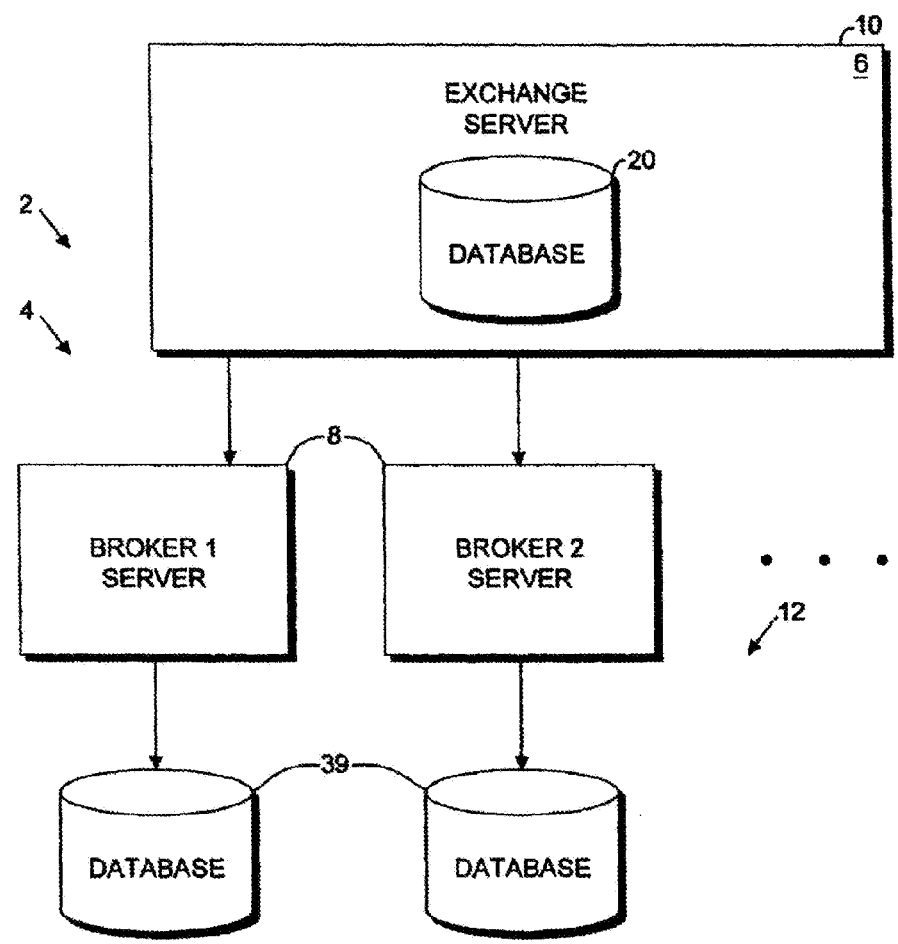
FIG. 1 is a block diagram showing a distributed network embodying one aspect of the system of the present invention.

Referring to the drawings in more detail, the reference numeral 2 generally designates a system for managing e-commerce transactions utilizing a distributed network 4 with a central exchange computer system 6 and multiple remote computer systems 8 (FIG. 1). Without limitation on the generality of useful applications of the system 2, an exemplary aspect or application thereof is described in connection with transactions involving tickets to events, such as sporting events, entertainment and theater. The distribution system for such merchandise includes a central administrator 10 associated with the central exchange computer 6 and a network of point-of-sale (POS) ticket brokers, affiliates or dealers 12 associated with respective remote computers 8. The ticket brokers 12 typically buy from and sell to their respective customers, who can comprise individual end users 14. The customers can also comprise other brokers 12 in connection with broker-to-broker (B2B) transactions.

Figure 2:
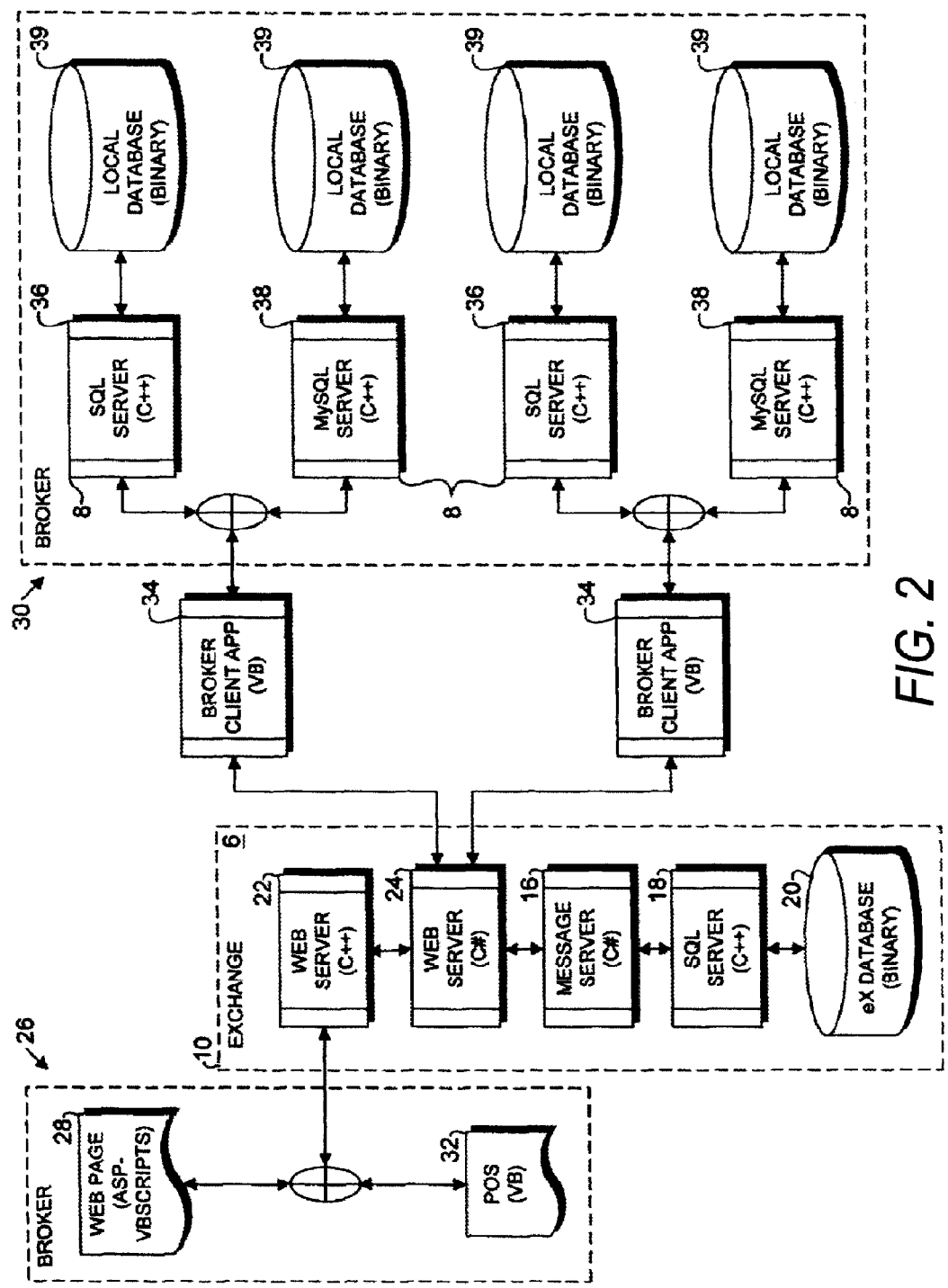
FIG. 2 is a block diagram of the distributed network, showing components thereof.

FIG. 2 shows the central exchange system 6 with a message server 16 connected to an SQL server 18, which accesses an exchange database 20. An exchange web service 22 connects the message server 16 to a web server 24. The components of the system 2 can be programmed with a number of different programming languages using various suitable programming techniques including, but not limited to, variations of C (e.g., C++, C#, etc.).

A web side 26 includes a web page 28 for direct interaction with other brokers 12 and with end users 14. A broker side 30 includes point-of-sale (POS) software 32 adapted for managing broker operations. The brokers 12 can interface with the central exchange system 6 through broker client applications 34, which can also be programmed with a number of different programming languages using various suitable programming techniques including, but not limited to, Visual Basic (VB). The brokers' POS software can comprise different levels of features and functionalities, such as the SQL server 36 with a full range of features and functionalities, and a MySQL server 38 for a reduced-feature application. The broker-controlled servers 36, 38 can access data in respective local databases 40 whereby the broker subscribers control their perspective data in their own databases 39, which are connected to respective remote computers 8 and can be physically located at the brokers' respective places of business. The brokers' computers 8 are adapted for downloading ticket information from and uploading or "pushing up" ticket information to the central exchange system 6 according to predetermined rules, at least some of which are controlled by the brokers 12, as described in more detail below.

Transactions

Without limitation on the generality of useful applications of the invention, an exemplary set of transactions, which can be managed by the system 2, is described as follows:

a) Buying and selling tickets directly to the central exchange system 6.

b) Posting tickets to the exchange 6 in either real-time (RT) corresponding to the tickets actually possessed (i.e., in inventory) by the broker 12, or in non real-time (NRT) representing orders for tickets to be fulfilled using the system's resources.

c) Adding customers, which can comprise either end-user customers 14 or other brokers 12, to the exchange database 20.

d) Reserving tickets.

e) Buying tickets.

f) Selling tickets.

g) Buying tickets and reselling to customers (single transaction).

h) Obtaining customer information.

i) Unreserving tickets.

j) Verifying ticket existence.

k) Updating exchange application through message server 16.

l) Remote debugging through the SQL 18.

m) Checking status of pending orders.

n) Obtaining remote order listing.

o) Generic exchange, i.e. getting invoice data, purchase order data and/or billing data including markups, without building a customer record.

p) Getting global updates and of events including downloading latest event lists from the central exchange server 6 and pushing up event lists from brokers 12 for comparison with current lists and updating same, if necessary.

Ticket Grouping

The ticket grouping function forms groups of tickets by internally matching certain criteria, such as event, date, time, section, row, face value and price. For example, when the queue record indicates that tickets are to be added to the exchange, the broker's local database 20 is searched for internal matches whereby groups are created. Customers requesting certain blocks of adjacent or contiguous seats at specific events can thus be accommodated. Moreover, the system forms such groups based on price whereby all of the tickets within particular groups have common pricing. Pricing can be considered in connection with face value, customer list price (corresponding to broker selling price) and broker wholesale price. Moreover, certain entities, such as the city of Chicago, impose sales tax on ticket sales, which is calculated by the system 2 and added to the ticket selling price. Moreover, certain states restrict prices for reselling tickets, which restrictions can be accommodated by the system 2 in connection with ticket pricing.

The ticket grouping function can increase system efficiency and transaction speed in connection with posting tickets. In particular, groups of tickets comprise less data than the same tickets handled individually, whereby less data is pushed back and forth and greater speed is realized when the grouping function is utilized for posting tickets.

Priced Events

Priced event transactions involve non real time (NRT) ticket inventory whereby brokers 12 can offer for sale tickets that they don't actually possess, Priced event tickets can be ordered by customers 14 in real-time (RT) transactions. The brokers 12 then procure the necessary presold, priced event tickets by using the resources of the system 2, or by procuring them from their own sources. Real-time (RT) inventories, by contrast, comprise tickets actually possessed by the brokers 12.

Priced event sales occur in real-time when customers place orders for specific numbers of tickets to specific events. The system generally accommodates selecting seating areas in priced events. For example, seats are commonly located by section, row and seat number in many venues, with ticket pricing corresponding to seat locations. Thus, priced event customers can order tickets online with a particular broker 12 or with the central exchange 6. The orders can specify the seating areas. The central database 20 is then searched by the system and the orders are filled as tickets become available. The central exchange 6 provides seating section information for venues. For example, broker affiliates 12 can access graphical displays of seating in particular venues, with seating sections designated alphanumerically or in colors to assist in ticket selection for priced events and real-time purchases. For example, the information in a priced event order can comprise an identification of the event, the desired seating sections (e.g., by letter or color designation), ticket quantity and ticket price.

The priced event function of the present invention facilitates sharing inventory by the broker affiliates 12 to the exchange 6, thus broadening the potential customer base system-wide. However, the broker affiliate 12 relinquishes tickets from its own inventory, thus possibly losing the opportunity for direct sales. The system accommodates the broker affiliates by enabling them to set certain rules for offering and selling their tickets on the exchange. These rules are listed in FIG. 3, and generally provide control over such variables as the web sites on which particular ticket groups are shown, showing ticket groups on the exchange, which brokers' tickets are shown on other brokers' web sites, pricing markups and quantity, event and other variable restrictions.

Other System Components

Figure 4:
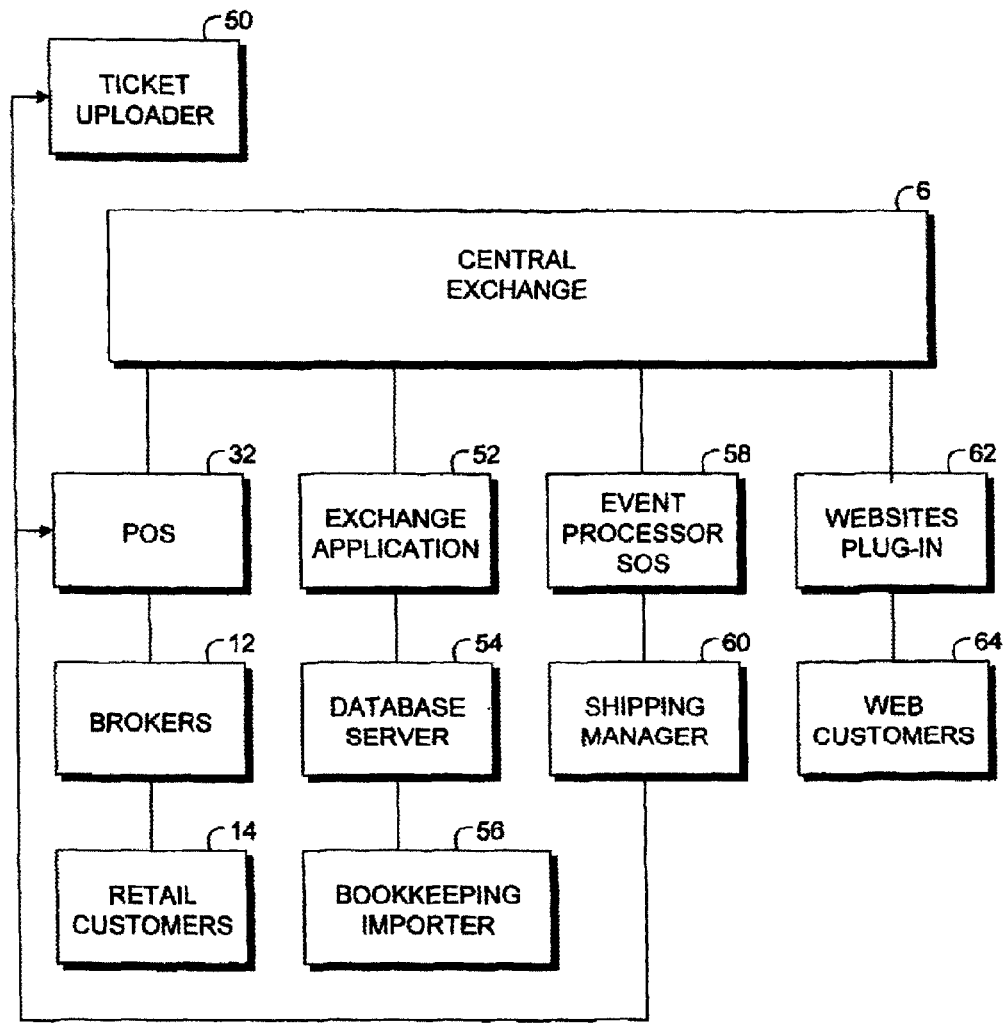
FIG. 4 is a flowchart showing the steps in a typical transaction.

FIG. 4 shows the central exchange 6 in relation to other components of the system 2. The POS 32 is described in more detail below and generally manages transactions for the brokers 12, who interface with customers 14. An exchange application 52 connects to a database server 54, which in turn connects to a bookkeeping importer 56. The system can be adapted to interface with bookkeeping systems, including but not limited to QuickBooks software available from Intuit, Inc. of Mountain View, Calif. 94039. The bookkeeping importer 56 provides for automated record insertion for financial accounting software. Other suitable bookkeeping software can be used with the system 2.

An event processor or special order system (SOS) 58 consists of a web-based bulletin board through which ticket inventories can be uploaded and is described in more detail below. The system further provides general exchange management, web site content management and shipping management. For example, a shipping manager system 60 can interface with various third party shipping service providers, such as overnight mail and courier services. The shipping manager system can ship, track and delete packages; print labels; provide customer information; generate various logs and reports; and print airbills. The central exchange system 6 provides RT and office-to-office order processing services.

A ticket uploader 50 is provided for uploading ticket inventories from other point-of-sale (POS) systems. Therefore, a broker utilizing another POS system can participate in the distributed network 4 of the present invention. The participating broker installs a ticket uploader (TU) program and sets certain variables, such as the timing of automatic uploading at predetermined intervals. Alternatively, ticket inventories can be uploaded manually. The tickets uploaded from these other sources are automatically placed on the network. Therefore, an extensive inventory of tickets placed on the web can be placed on the central exchange 6 for distribution by the brokers 12. Software in the central exchange 6 is adapted for interfacing with other vending and distribution systems, such as online auctions. Thus, brokers can push up their inventories for sale through online, live auctions. The broker can control various aspects of auction participation, such as providing templates and managing content. Moreover, the central exchange 6 takes tickets off the exchange while they are involved in online auctions and returns them to the central exchange inventory after the auctions close, all under the direction of the participating broker 12, which can set rules for such transactions.

Figure 5:
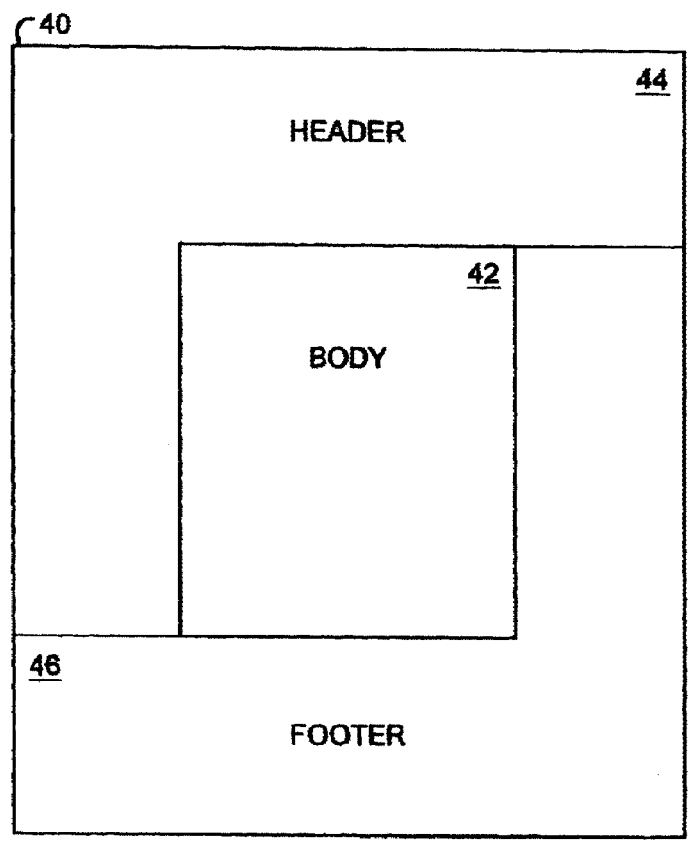
FIG. 5 is a diagram of a broker web page.

A website plug-in component 62 is available for the use of web customers 64 in creating their own websites for e-commerce utilizing the exchange network and the distributed network. A web page template 40 is shown in FIG. 5 and includes a body 42, which can display a default body provided by the system 2, or can be customized by the broker 12. A header 44 and a footer 46 are also provided and are adapted for customizing by a particular broker 12 or web customers 64. As shown in FIG. 5, the header 44 and the footer 46 wrap the body 42 and show on all pages of the web site. Examples of features available for customization by the brokers include plug-in fonts, sizes, colors, etc. Brokers 12 are thus able to graphically individualize their web sites for promoting their respective businesses and for distinguishing them from other web sites. The body 42 typically includes a search page, search results, ASP events page and category lists. The HTML information is stored in the system database.

Special Order System (POS)

FIGS. 6-9 show special order system (SOS) components and functionalities. FIG. 6 shows the screen displays for searching SOS events and providing ticket information, including "fake" tickets as described above. FIG. 7 is an SOS screen display showing possible ticket splits based on rules governing sales from packages of tickets. FIG. 8 shows broker settings, including markups. FIG. 9 shows web settings.

Point-of-Sale (POS)

Figure 11:
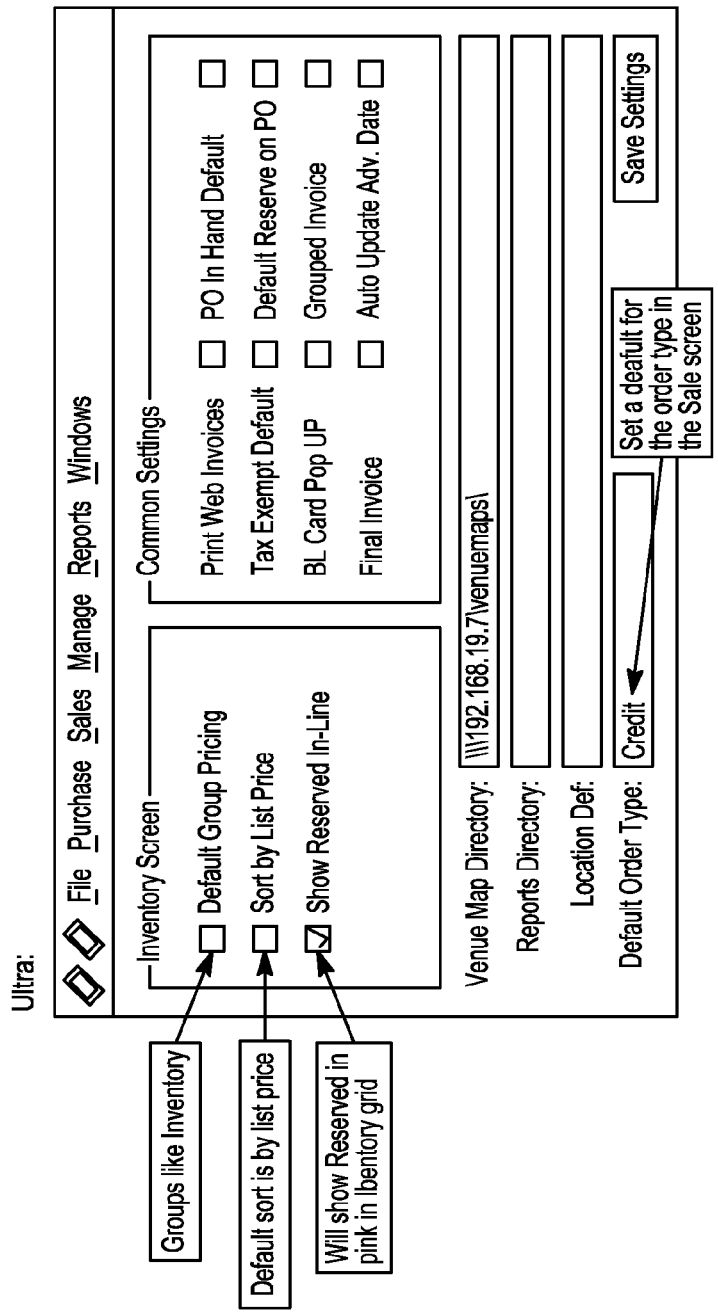

FIG. 10 is a flowchart showing a typical transaction handled by the POS system associated with a broker 12. The following description of the point-of-sale (POS) system and methodology applies to the management of transactions by a broker affiliate 12. FIG. 11 is a screen display of settings for a full-featured version of the software, including transactional defaults. FIG. 12 shows the settings screen for a reduced-feature version of the software, which implements the system and methodology of the present invention. FIG. 13 shows the screens for entering a new purchase order (PO). FIG. 14 shows the screen for searching POs. FIG. 15 shows the screen for creating mass PO tickets. FIG. 16 shows the screen for searching for mass POs, advanced quotes or cancelled POs. FIG. 17 shows the screen for advanced quotes. FIG. 18 shows the screen for the PO queue. FIG. 19 shows the sales screen for pending preorders, utilizing the value event pricing function described above. FIG. 20 shows the screen for order completion. FIG. 21 shows the inventory screen. The screen that is presented by selecting the "Set/Reserve" option is shown in FIG. 22.

Within the inventory/exchange grid different colors and icons can be used to provide certain information about the applicable tickets. For example, italics can indicate consignment inventory. Pink can identify reserved inventory. Green designates a block or group of tickets with section, row and seat information. Cost highlighted with yellow indicates that the PO has not yet been completed. NRT brokers are highlighted in yellow, and RT brokers are highlighted in green. The broker's name in pink indicates the broker's own tickets. "In" with a checkmark indicates that the tickets were added as "In Hand", "W" with a mouse icon indicates that the tickets are shared to the web. "X" with a red ticket icon indicates that the tickets are shared to the exchange. "Loc" indicates the office locations from which the tickets were added.

Figure 24:
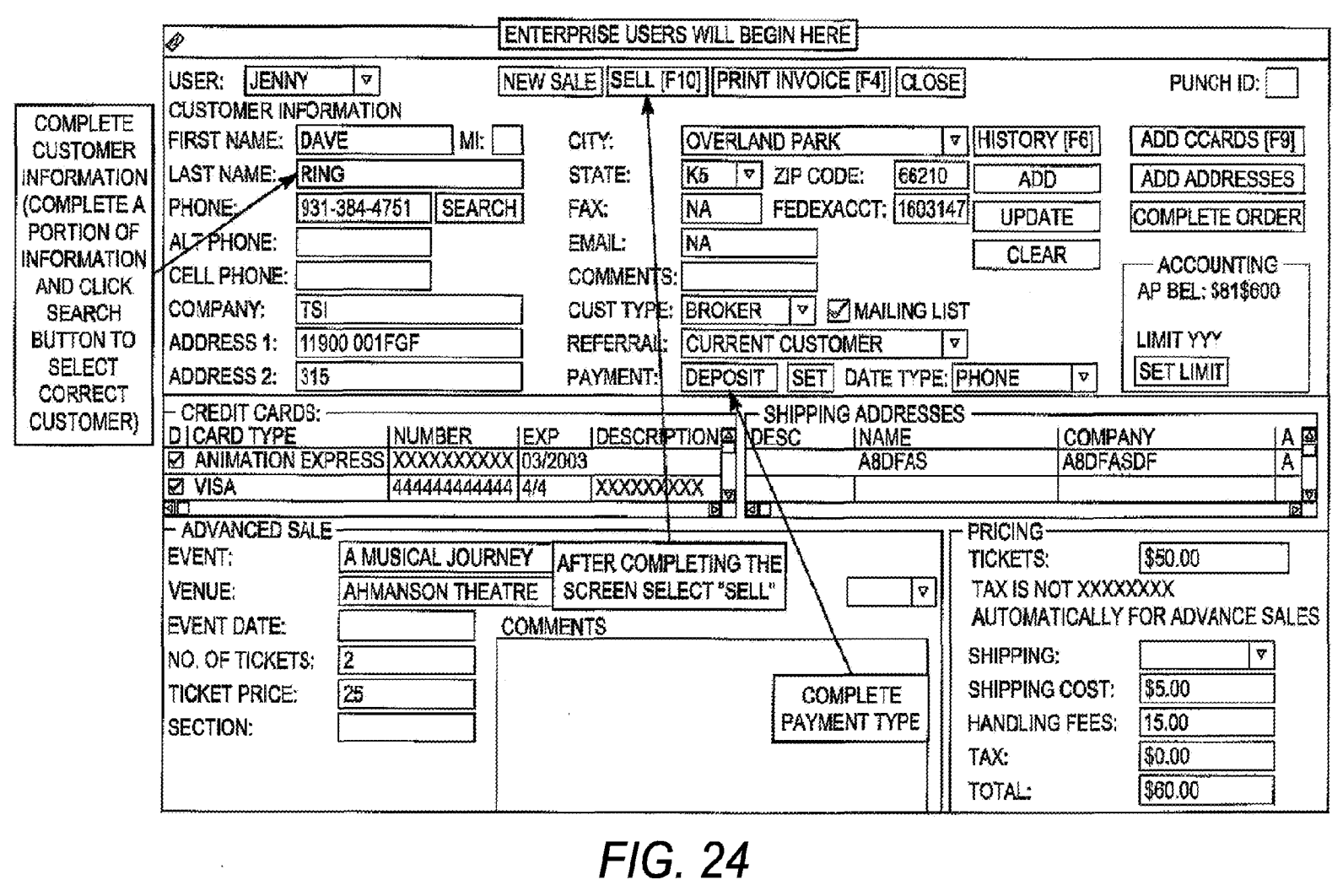
Figure 26:
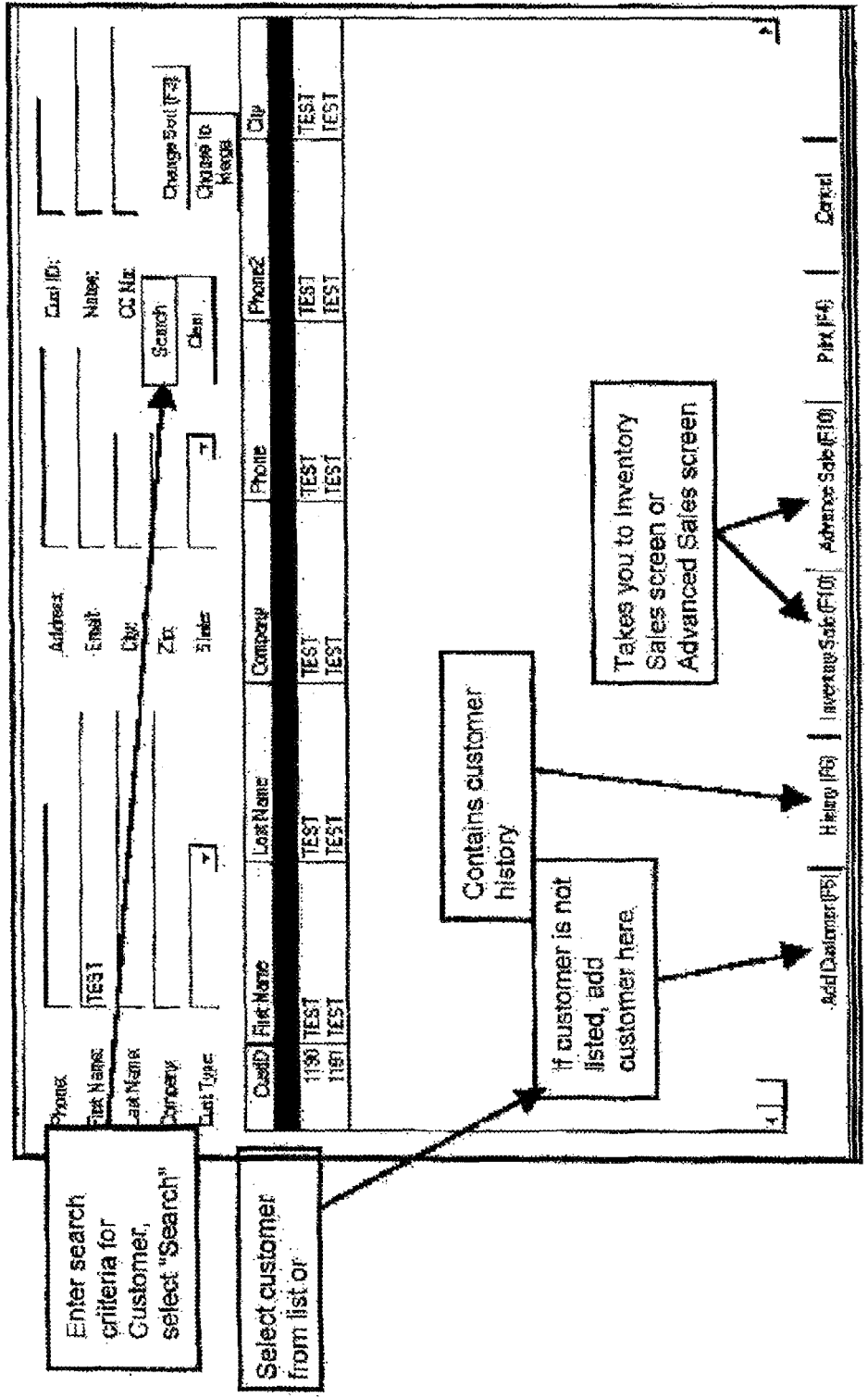
Figure 28:
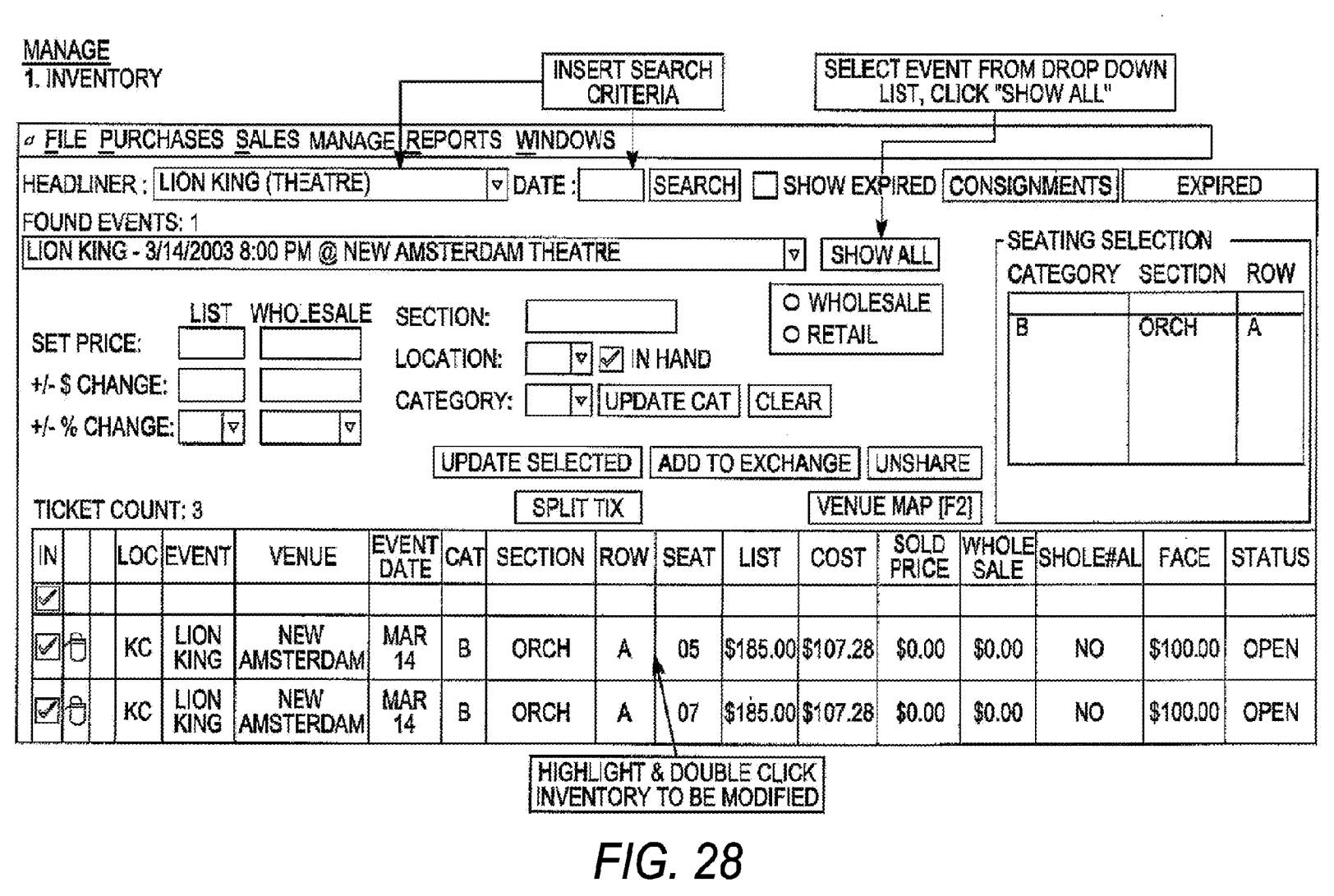
Figure 29:
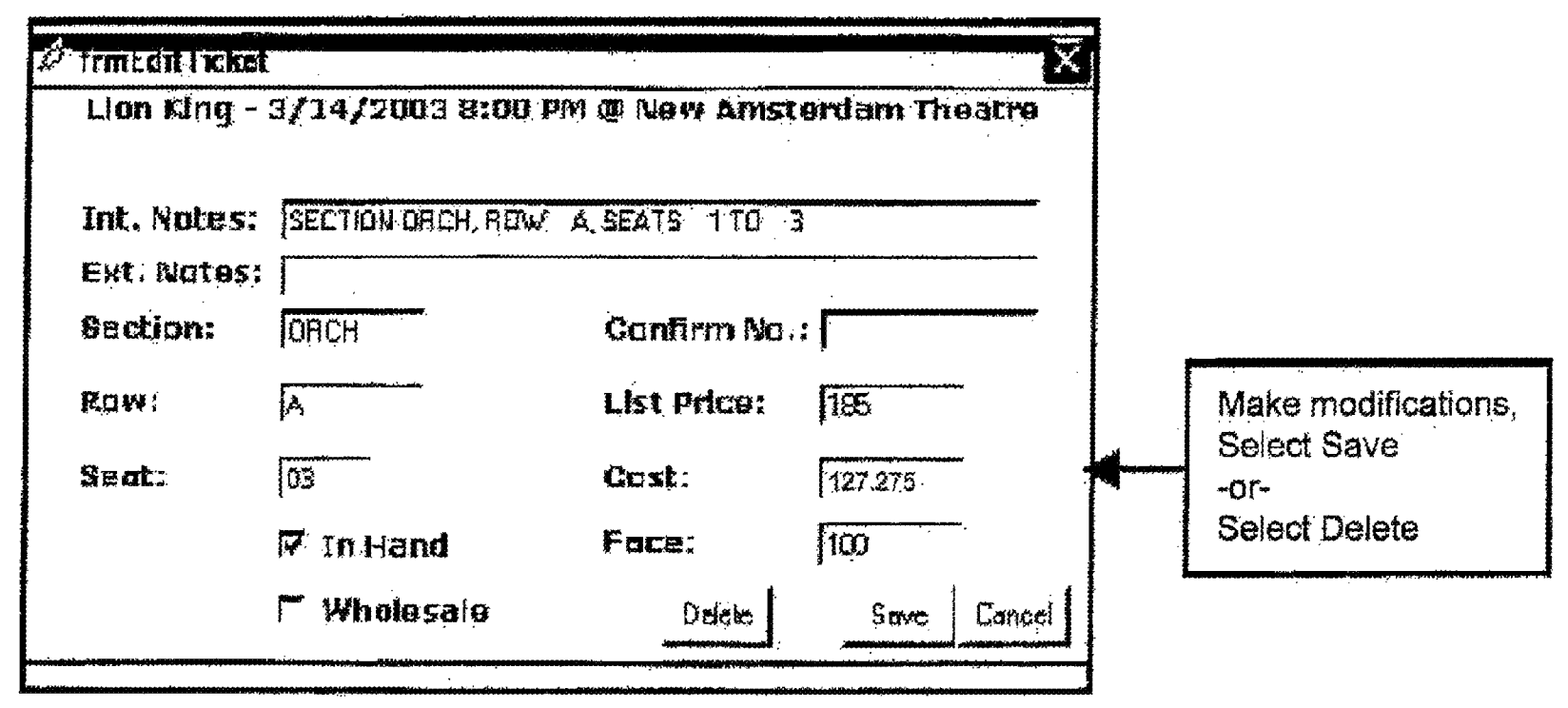

FIG. 23 shows a pre orders screen, and FIG. 24 shows the comparable screen from the reduced-feature software version. FIG. 25 shows the screens that are applicable to types of deposit payments. FIG. 26 shows the screen for adding new customers, searching for customer information, modifying an existing sale or PO or creating a new sale. FIG. 27 shows the screen for retrieving exchange broker information. FIGS. 28 and 29 are inventory management screens.

Figure 33:
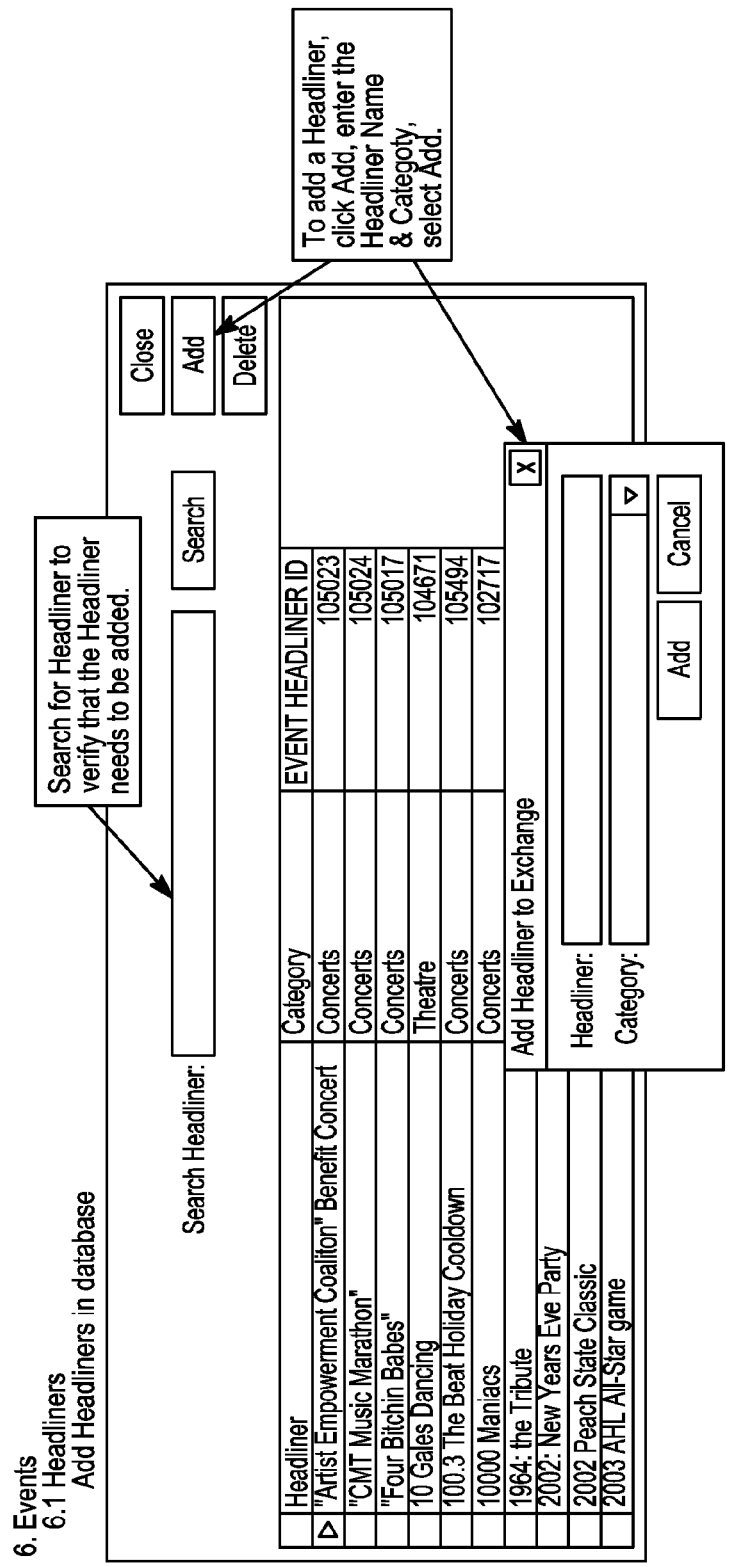
Figure 34:
Figure 35:

The system accommodates sharing tickets with other exchange systems through the screen shown in FIG. 30. Pre order pricing with price and quantity settings is shown in FIG. 31. FIG. 32 shows the screen for categorizing ticket inventory. FIG. 33 shows the screen for adding headliners for events to the brokers' databases. FIG. 34 shows the screen for adding, deleting and modifying options for customer types, office locations, shipping types and the discounts to the database. FIG. 35 is a referral list screen for adding and deleting customer referrals. FIG. 36 is a shopping cart screen. The broker-to-broker (B2B) screen FIG. 37 permits regulating payment types and reserved times individually for all of the brokers 12 who use the exchange.

Figure 38B:
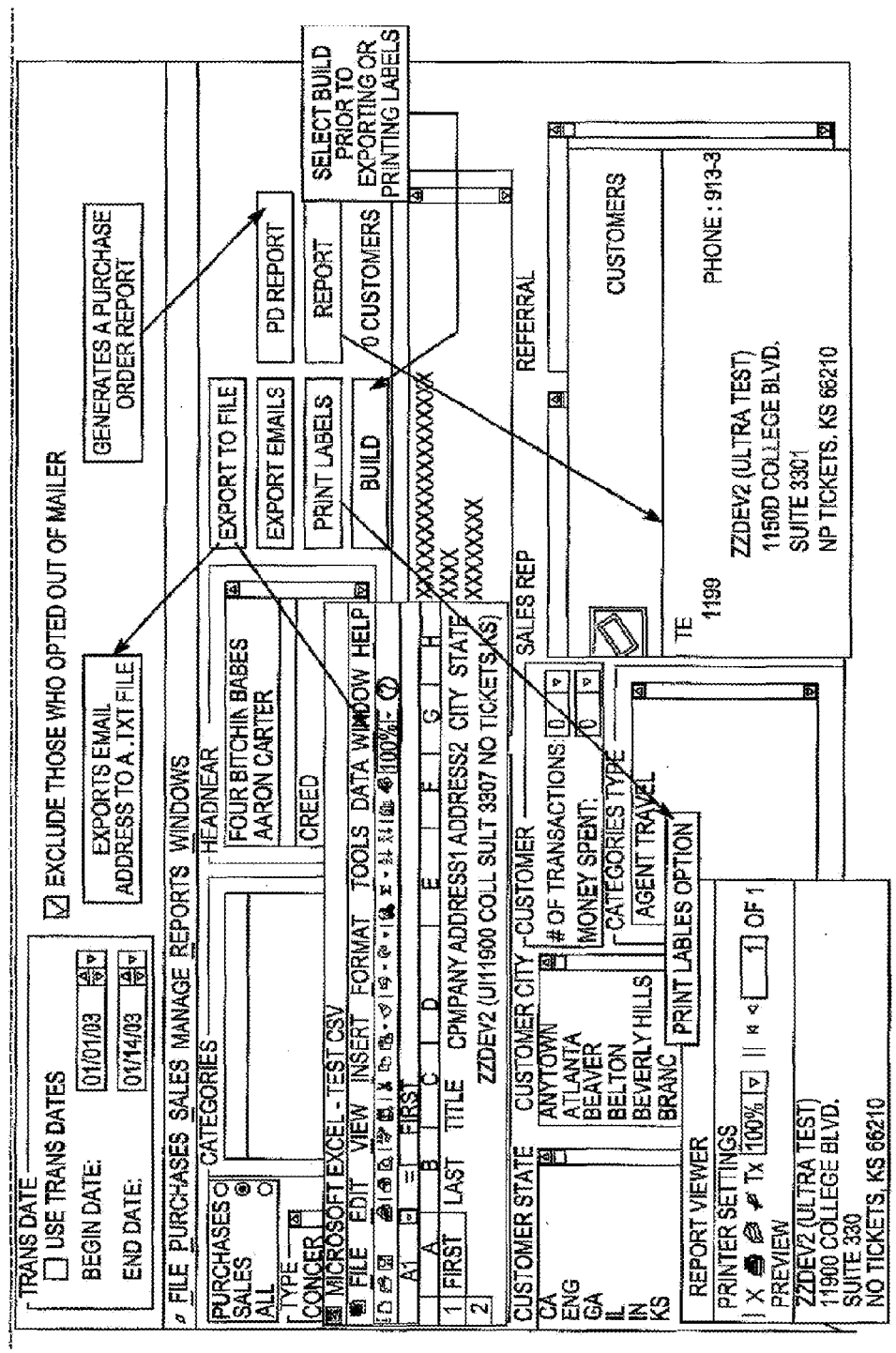
Figure 46:
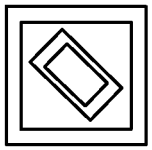
Figures 49, 50:
Figure 57:
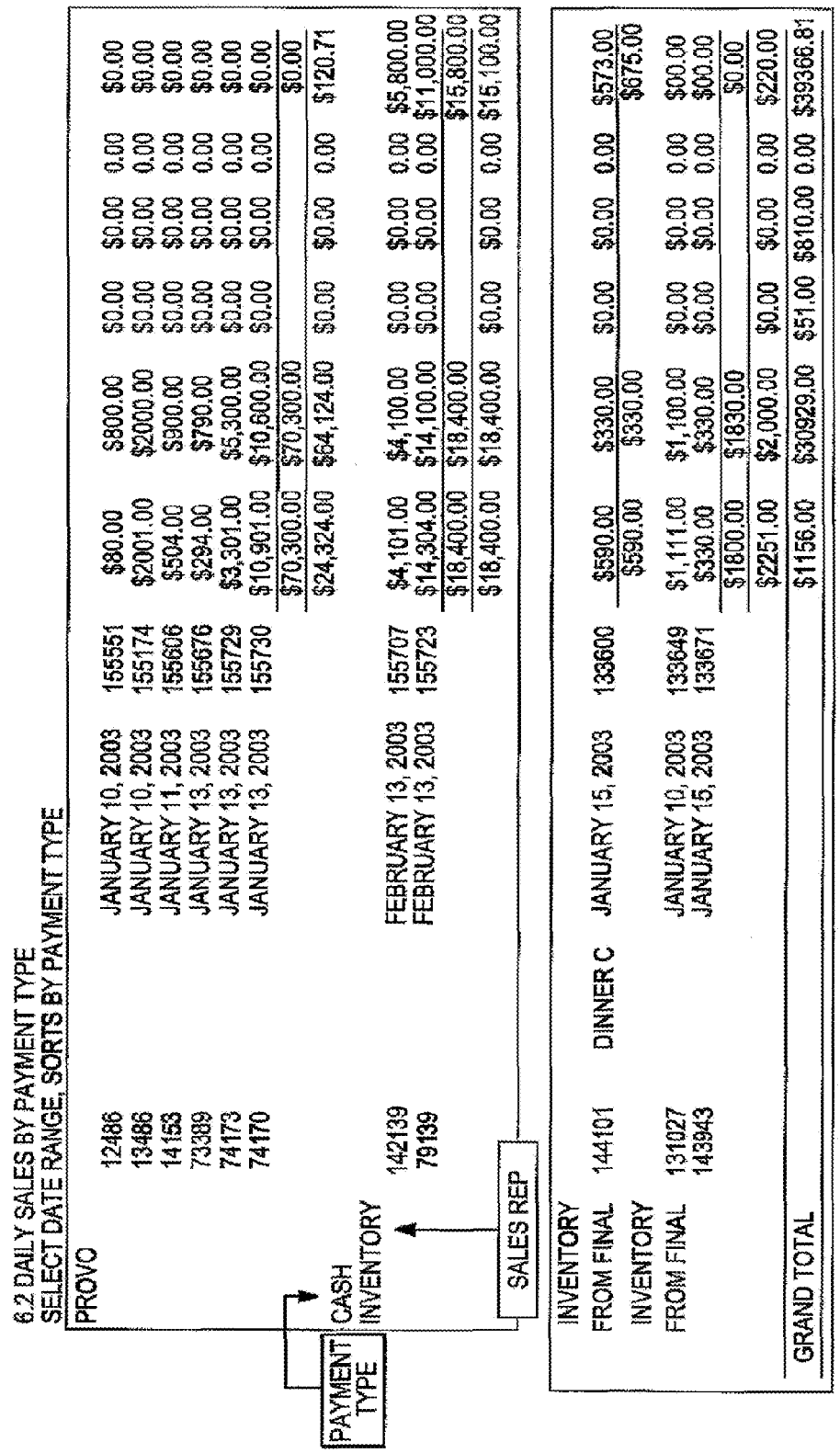
Figure 58:
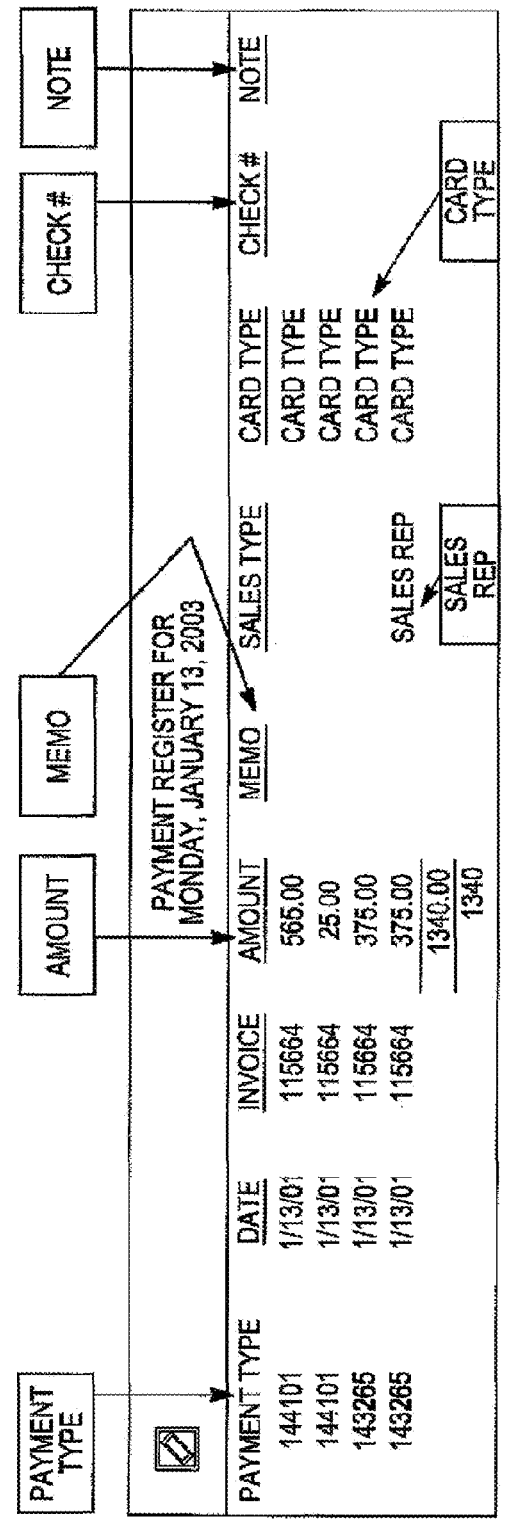
Figure 61:
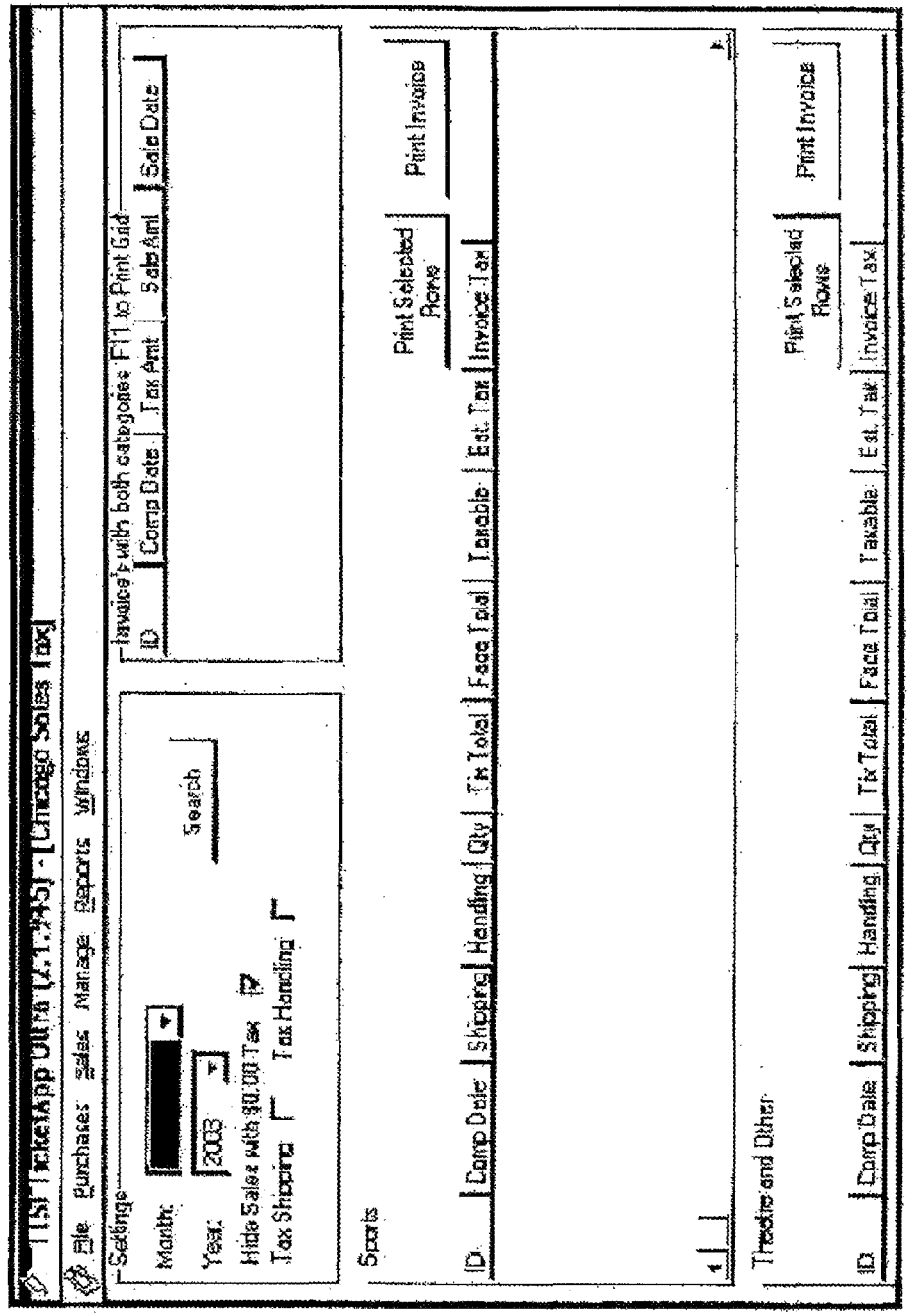
Figure 63:
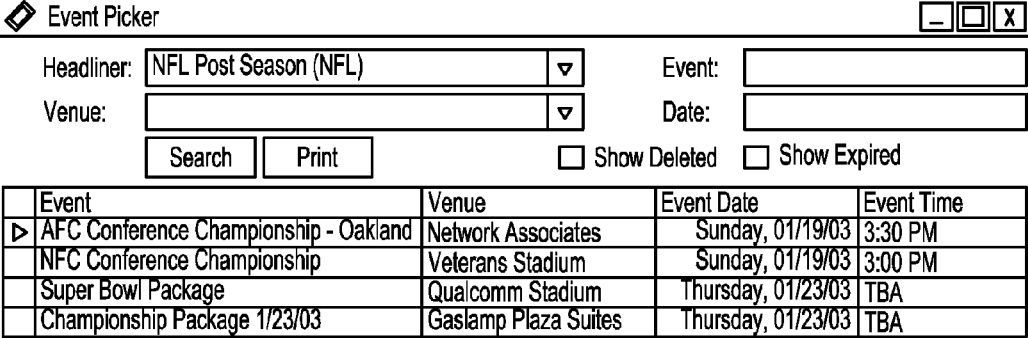
Figure 64:
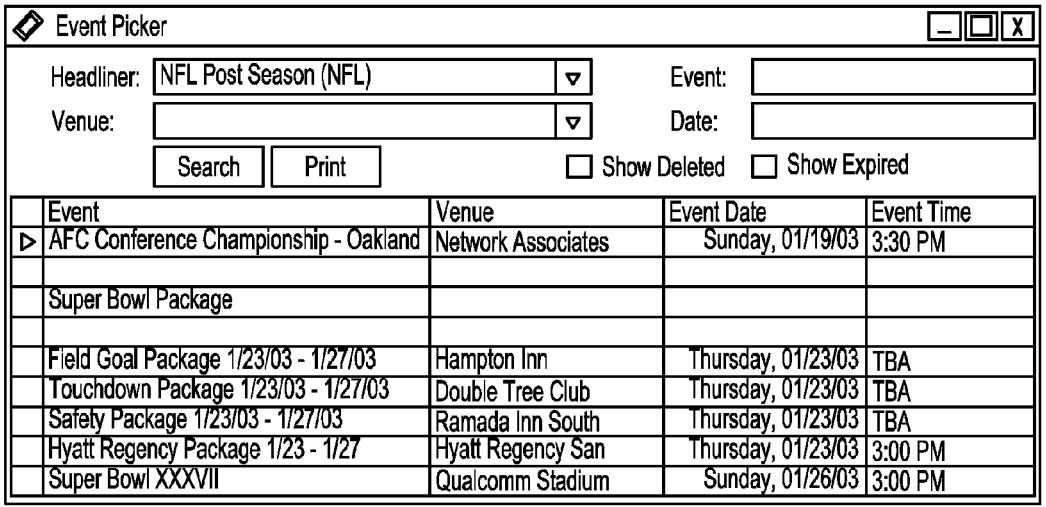
Figure 65:
Figure 67:
Figure 72:
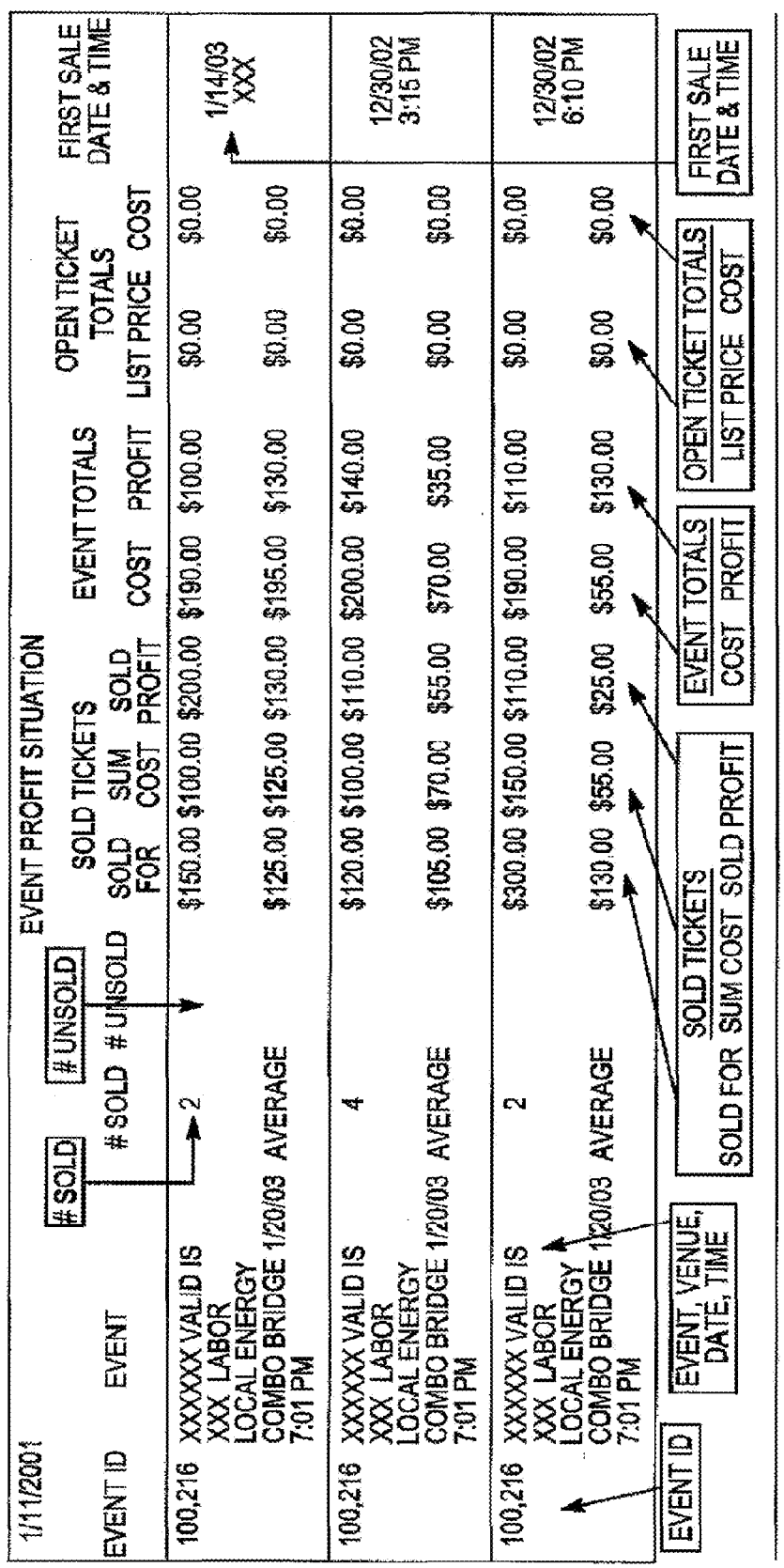

FIG. 38 is a report mailing list screen. FIG. 39 is a screen for event reporting and FIG. 40 shows current events. FIG. 41 is a sold tickets search utility and FIG. 42 shows a sold tickets report. FIG. 43 shows a reserve ticket list. FIG. 44 shows an expired inventory report, which is automatically generated. FIG. 45 shows an automatically generated report of tickets with no purchase orders. FIG. 46 shows an automatically generated sold tickets report. FIG. 47 shows a fax list search report. FIG. 48 shows a sample fax form. FIG. 49 shows a fax list for a number of days and FIG. 50 shows the automatically generated report. FIGS. 51-54 show shipping, invoice, PO and web sales register screens respectively. FIG. 55 shows exchange transactions. FIG. 56 shows sales by event and FIG. 57 shows sales by payment type. FIG. 58 shows daily payments and deposits. FIG. 59 shows daily purchases by payment type. FIG. 60 shows canceled orders. FIGS. 61 and 62 show tax information pertinent to the city of Chicago. FIG. 63 shows purchases for an event. FIG. 64 is an event picker. FIG. 65 shows purchase orders by event. FIG. 66 shows an example of a screen displaying event sales. FIG. 67 shows an event sales report. FIGS. 68-71 show weekly sales report information. FIG. 72 shows an event profit/situation screen. FIG. 73 shows selected events. FIG. 74 shows a daily total report. FIG. 75 shows a custom web sales representatives and dates report. FIG. 76 shows a sales report, including a breakdown by representative.

It is to be understood that while certain embodiments and/or aspects of the invention have been shown and described, the invention is not limited thereto and encompasses various other embodiments and aspects.

We claim:

1. A method of managing electronic commerce transactions involving goods or services, the method comprising:
    receiving at a computer system of a service provider, information corresponding to goods or services available for sale to customers by other service providers and by the service provider;
    maintaining a rules set at the computer system specifying transaction conditions with respect to goods or services available from a first of the other service providers that have been identified by the first of the other service providers as being available for posting on other service provider sites; and
    managing electronic commerce transactions involving sales of goods or services available from the first of the other service providers that are posted on the respective sites of the other service providers and sold to customers by the other service providers in accordance with the transaction conditions.

2. The method of claim 1, further comprising:
    receiving information from the first of the other service providers comprising one or more groups of goods or services identified by the first of the other service providers as available for sale directly to customers; and
    sending the one or more groups of goods or services identified by the first of the other service providers as available for sale directly to customers for posting on a site of the first of the other service providers hosted by the computer system.

3. The method of claim 2, wherein the one or more groups of goods or services identified by the first of the other service providers as available for sale directly to customers include a group of goods or services identified by the first of the other service providers as being available for posting by the other service providers on the respective sites of the other service providers.

4. The method of claim 1, wherein one or more of the respective sites of the other service providers are hosted by the computer system.

5. The method of claim 1, wherein the rules set specifies posting conditions identifying service providers which are allowed to post goods or services available from the first of the other service providers and identifying service providers which are not allowed to post goods or services available from the first of the other service providers.

6. The method of claim 5, wherein the posting conditions specify a required price markup for service providers which are allowed to post goods or services available from the first of the other service providers.

7. The method of claim 1, further comprising:
    posting one or more groups of goods or services available for sale that are not possessed by the first of the other service providers;
    receiving a purchase order involving the one or more groups of goods or services that are not possessed by the first of the other service providers; and
    managing an electronic commerce transaction conducted by the first of the other service providers to procure goods or services for fulfilling the purchase order.

8. One or more computer-readable storage devices storing executable computer program instructions that when executed cause a computer system of a first service provider to:
    receive at the computer system information corresponding to goods or services available for sale to customers by a second service provider different from the first service provider;
    maintain a rules set at the first service provider specifying transaction conditions with respect to goods or services available from the second service provider that have been identified by the second service provider as being available for posting by other service providers on respective websites of the other service providers; and
    manage electronic commerce transactions involving sales of goods or services available from the second service provider that are posted on the respective websites of the other service providers and sold to customers by the other service providers in accordance with the transaction conditions.

9. The one or more computer-readable storage devices of claim 8, further storing computer program instructions for:
    receiving information from the second service provider comprising one or more groups of goods or services identified by the second service provider as available for sale directly to customers; and
    sending the one or more groups of goods or services identified by the second service provider as available for sale directly to customers for posting on a website of the second service provider hosted by the computer system.

10. The one or more computer-readable storage devices of claim 9, wherein the one or more groups of goods or services identified by the second service provider as available for sale directly to customers include a group of goods or services identified by the second service provider as being available for posting by the other service providers on the respective websites of the other service providers.

11. The one or more computer-readable storage devices of claim 8, wherein one or more of the respective websites of the other service providers are hosted by the computer system.

12. The one or more computer-readable storage devices of claim 8, wherein the rules set specifies posting conditions identifying the other service providers which are allowed to post goods or services available from the second service provider and identifying service providers which are not allowed to post goods or services available from the second service provider.

13. The one or more computer-readable storage devices of claim 12, wherein the posting conditions specify a required price markup for service providers which are allowed to post goods or services available from the second service provider.

14. The one or more computer-readable storage devices of claim 8, further storing computer program instructions for:
  posting one or more groups of goods or services available for sale that are not possessed by the second service provider;
  receiving a purchase order involving the one or more groups of goods or services that are not possessed by the second service provider; and
  managing an electronic commerce transaction conducted by the second service provider to procure goods or services for fulfilling the purchase order.

15. A computer system of a first service provider comprising:
  a non-transitory memory storing account information for service providers; and
  one or more processors adapted to:
    receive information corresponding to goods or services available for sale to customers by a second service provider different than the first service provider;
    maintain a rules set specifying transaction conditions with respect to goods or services available from the second service provider that have been identified by the second service provider as being available for posting by other service providers on respective websites of the other service providers; and
    manage electronic commerce transactions involving sales of goods or services available from the second service provider that are posted on the respective websites of the other service providers and sold to customers by the other service providers in accordance with the transaction conditions.

16. The computer system of claim 15, wherein the one or more processors are further configured to:
  receive information from the second service provider comprising one or more groups of goods or services identified by the second service provider as available for sale directly to customers; and
  send the one or more groups of goods or services identified by the second service provider as available for sale directly to customers for posting on a website of the second service provider affiliate hosted by the computer system.

17. The computer system of claim 16, wherein the one or more groups of goods or services identified by the second service provider as available for sale directly to customers include a group of goods or services identified by the second service provider as being available for posting by the other service providers on the respective websites of the other service providers.

18. The computer system of claim 15, wherein the rules set specifies posting conditions identifying the other service providers which are allowed to post goods or services available from the second service provider and identifying service providers which are not allowed to post goods or services available from the second service provider.

19. The computer system of claim 18, wherein the posting conditions specify a required price markup for service providers which are allowed to post goods or services available from the second service provider.

20. The computer system of claim 15, wherein the one or more processors are further configured to:
  post one or more groups of goods or services available for sale that are not possessed by the second service provider;
  receive purchase order involving the one or more groups of goods or services that are not possessed by the second service provider; and
  manage an electronic commerce transaction conducted by the second service provider to procure goods or services for fulfilling the purchase order.

* * * * *

UNITED STATES PATENT AND TRADEMARK OFFICE
CERTIFICATE OF CORRECTION

PATENT NO. : 8,577,743 B2  
APPLICATION NO. : 13/489310  
DATED : November 5, 2013  
INVENTOR(S) : Dubin et al.

Page 1 of 1

It is certified that error appears in the above-identified patent and that said Letters Patent is hereby corrected as shown below:

On the title page, item (57), in "Abstract", in column 2, line 11, delete "web site-related" and insert --website-related--, therefor In the Claims In column 10, line 32, in Claim 20, delete "arc" and insert --are--, therefor Signed and Sealed this  
Twenty-fifth Day of November, 2014

Michelle K. Lee  
*Deputy Director of the United States Patent and Trademark Office*